(12) United States Patent
Khoshnevisan et al.

(10) Patent No.: US 12,526,088 B2
(45) Date of Patent: Jan. 13, 2026

(54) HYBRID AUTOMATIC REPEAT REQUEST ACKNOWLEDGEMENT CODEBOOK RETRANSMISSION FOR MULTIPLE DOWNLINK CONTROL INFORMATION BASED MULTIPLE TRANSMIT RECEIVE POINT

(71) Applicant: QUALCOMM Incorporated, San Diego, CA (US)

(72) Inventors: Mostafa Khoshnevisan, San Diego, CA (US); Yan Zhou, San Diego, CA (US); Konstantinos Dimou, New York, NY (US); Yi Huang, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 449 days.

(21) Appl. No.: 18/153,715

(22) Filed: Jan. 12, 2023

(65) Prior Publication Data

US 2023/0254072 A1 Aug. 10, 2023

Related U.S. Application Data

(60) Provisional application No. 63/267,701, filed on Feb. 8, 2022.

(51) Int. Cl.
*H04L 1/1829* (2023.01)
*H04L 5/00* (2006.01)
*H04W 72/232* (2023.01)

(52) U.S. Cl.
CPC .......... *H04L 1/1854* (2013.01); *H04L 5/0035* (2013.01); *H04L 5/0053* (2013.01); *H04W 72/232* (2023.01)

(58) Field of Classification Search
CPC ... H04L 1/1685; H04L 1/1812; H04L 1/1854; H04L 5/0032; H04L 5/0035;
(Continued)

(56) References Cited

U.S. PATENT DOCUMENTS 11,595,921 B2 * 2/2023 Chen ..................... H04W 72/23
11,723,032 B2 * 8/2023 Yi ........................ H04L 5/0053
370/330

(Continued)

FOREIGN PATENT DOCUMENTS

CN 117426061 A * 1/2024 ........... H04L 1/0003
CN 117795883 A * 3/2024 ........... H04L 1/1816
(Continued)

OTHER PUBLICATIONS

International Search Report and Written Opinion—PCT/US2023/060653—ISA/EPO—Apr. 25, 2023.

*Primary Examiner* — Eric Nowlin
(74) *Attorney, Agent, or Firm* — Harrity & Harrity LLP

(57) ABSTRACT

Various aspects of the present disclosure generally relate to wireless communication. In some aspects, a user equipment (UE) may receive, in a control resource set (CORESET) associated with a first CORESET pool index or a second CORESET pool index, downlink control information (DCI) including an indication that a hybrid automatic repeat request acknowledgement (HARQ-ACK) codebook scheduled in a first slot is to be retransmitted in a second slot. The UE may transmit, in the second slot and in connection with receiving the DCI, a first HARQ-ACK codebook associated with the first CORESET pool index or a second HARQ-ACK codebook associated with the second CORESET pool index. Numerous other aspects are described.

30 Claims, 15 Drawing Sheets

(58) Field of Classification Search
CPC ... H04L 5/0053; H04L 5/0055; H04L 5/0078; H04L 5/0094; H04W 72/0446; H04W 72/232
See application file for complete search history.

(56) References Cited

U.S. PATENT DOCUMENTS

| | | | | |
|---|---|---|---|---|
| 12,016,016 | B2 * | 6/2024 | Yi | H04W 72/1268 |
| 12,052,691 | B2 * | 7/2024 | Khoshnevisan | H04L 5/0035 |
| 12,294,994 | B2 * | 5/2025 | Zhang | H04W 72/23 |
| 2020/0259625 | A1 | 8/2020 | Papasakellariou | H04B 7/0456 |
| 2021/0360616 | A1 * | 11/2021 | Yi | H04L 5/0053 |
| 2021/0368457 | A1 * | 11/2021 | Chen | H04W 72/1273 |
| 2022/0216955 | A1 * | 7/2022 | Kim | H04W 72/23 |
| 2022/0225360 | A1 * | 7/2022 | Yi | H04W 72/1268 |
| 2022/0232592 | A1 * | 7/2022 | Dimou | H04L 1/1861 |
| 2022/0304023 | A1 * | 9/2022 | Zhang | H04L 5/0037 |
| 2023/0046759 | A1 * | 2/2023 | Wang | H04L 5/0053 |
| 2023/0163886 | A1 * | 5/2023 | Matsumura | H04L 1/1896 370/329 |
| 2023/0254815 | A1 * | 8/2023 | Khoshnevisan | H04W 72/046 370/329 |
| 2023/0284218 | A1 * | 9/2023 | Chou | H04W 72/0446 370/329 |
| 2023/0300816 | A1 * | 9/2023 | Guo | H04W 72/11 370/329 |
| 2024/0195577 | A1 * | 6/2024 | Matsumura | H04L 5/0094 |
| 2024/0204919 | A1 * | 6/2024 | He | H04L 1/189 |
| 2024/0313929 | A1 * | 9/2024 | Jung | H04L 1/1816 |
| 2024/0430051 | A1 * | 12/2024 | Wang | H04B 7/024 |
| 2025/0071779 | A1 * | 2/2025 | Rossbach | H04L 1/1864 |

FOREIGN PATENT DOCUMENTS

| | | | | |
|---|---|---|---|---|
| EP | 3771133 | A1 | 1/2021 | |
| EP | 3430755 | B1 * | 9/2021 | H04L 1/008 |
| EP | 3993300 | A1 | 5/2022 | |
| WO | WO-2021010707 | A1 * | 1/2021 | H04B 7/024 |
| WO | WO-2023011637 | A1 * | 2/2023 | H04L 1/0003 |
| WO | WO-2023012617 | A1 * | 2/2023 | H04L 1/1816 |

* cited by examiner

HYBRID AUTOMATIC REPEAT REQUEST ACKNOWLEDGEMENT CODEBOOK RETRANSMISSION FOR MULTIPLE DOWNLINK CONTROL INFORMATION BASED MULTIPLE TRANSMIT RECEIVE POINT

CROSS-REFERENCE TO RELATED APPLICATION

This Patent Application claims priority to U.S. Provisional Patent Application No. 63/267,701, filed on Feb. 8, 2022, entitled "HYBRID AUTOMATIC REPEAT REQUEST ACKNOWLEDGEMENT CODEBOOK RETRANSMISSION FOR MULTIPLE DOWNLINK CONTROL INFORMATION BASED MULTIPLE TRANSMIT RECEIVE POINT," and assigned to the assignee hereof. The disclosure of the prior Applications is considered part of and is incorporated by reference into this Patent Applications.

FIELD OF THE DISCLOSURE

Aspects of the present disclosure generally relate to wireless communication and to techniques and apparatuses for hybrid automated repeat request acknowledgement (HARQ-ACK) codebook retransmission for multiple downlink control information (multi-DCI) based multiple transmit receive point (multi-TRP).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for wireless communication devices, such as a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level.

New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving, in a control resource set (CORESET) associated with a first CORESET pool index or a second CORESET pool index, downlink control information (DCI) including an indication that a hybrid automatic repeat request acknowledgement (HARQ-ACK) codebook scheduled in a first slot is to be retransmitted in a second slot. The method may include transmitting, in the second slot and in connection with receiving the DCI, a first HARQ-ACK codebook associated with the first CORESET pool index or a second HARQ-ACK codebook associated with the second CORESET pool index.

Some aspects described herein relate to a method of wireless communication performed by a network entity. The method may include transmitting, in a CORESET associated with a first CORESET pool index configured for a UE, DCI including an indication that a HARQ-ACK codebook scheduled in a first slot is to be retransmitted in a second slot, wherein the HARQ-ACK codebook to be retransmitted in the second slot is one of a first HARQ-ACK codebook associated with the first CORESET pool index or a second HARQ-ACK codebook associated with a second CORESET pool index configured for the UE.

Some aspects described herein relate to a UE for wireless communication. The UE may include a memory and one or more processors coupled to the memory. The one or more processors may be configured to receive, in a CORESET associated with a first CORESET pool index or a second CORESET pool index, DCI including an indication that a HARQ-ACK codebook scheduled in a first slot is to be retransmitted in a second slot. The one or more processors may be configured to transmit, in the second slot and in connection with receiving the DCI, a first HARQ-ACK codebook associated with the first CORESET pool index or a second HARQ-ACK codebook associated with the second CORESET pool index.

Some aspects described herein relate to a network entity for wireless communication. The network entity may include a memory and one or more processors coupled to the memory. The one or more processors may be configured to transmit, in a CORESET associated with a first CORESET pool index configured for a UE, DCI including an indication that a HARQ-ACK codebook scheduled in a first slot is to be retransmitted in a second slot, wherein the HARQ-ACK codebook to be retransmitted in the second slot is one of a first HARQ-ACK codebook associated with the first CORE- SET pool index or a second HARQ-ACK codebook associated with a second CORESET pool index configured for the UE.

Some aspects described herein relate to a non-transitory computer-readable medium that stores a set of instructions for wireless communication by a UE. The set of instructions, when executed by one or more processors of the UE, may cause the UE to receive, in a CORESET associated with a first CORESET pool index or a second CORESET pool index, DCI including an indication that a HARQ-ACK codebook scheduled in a first slot is to be retransmitted in a second slot. The set of instructions, when executed by one or more processors of the UE, may cause the UE to transmit, in the second slot and in connection with receiving the DCI, a first HARQ-ACK codebook associated with the first CORESET pool index or a second HARQ-ACK codebook associated with the second CORESET pool index.

Some aspects described herein relate to a non-transitory computer-readable medium that stores a set of instructions for wireless communication by a network entity. The set of instructions, when executed by one or more processors of the network entity, may cause the network entity to transmit, in a CORESET associated with a first CORESET pool index configured for a UE, DCI including an indication that a HARQ-ACK codebook scheduled in a first slot is to be retransmitted in a second slot, wherein the HARQ-ACK codebook to be retransmitted in the second slot is one of a first HARQ-ACK codebook associated with the first CORESET pool index or a second HARQ-ACK codebook associated with a second CORESET pool index configured for the UE.

Some aspects described herein relate to an apparatus for wireless communication. The apparatus may include means for receiving, in a CORESET associated with a first CORESET pool index or a second CORESET pool index, DCI including an indication that a HARQ-ACK codebook scheduled in a first slot is to be retransmitted in a second slot. The apparatus may include means for transmitting, in the second slot and in connection with receiving the DCI, a first HARQ-ACK codebook associated with the first CORESET pool index or a second HARQ-ACK codebook associated with the second CORESET pool index.

Some aspects described herein relate to an apparatus for wireless communication. The apparatus may include means for transmitting, in a CORESET associated with a first CORESET pool index configured for a UE, DCI including an indication that a HARQ-ACK codebook scheduled in a first slot is to be retransmitted in a second slot, wherein the HARQ-ACK codebook to be retransmitted in the second slot is one of a first HARQ-ACK codebook associated with the first CORESET pool index or a second HARQ-ACK codebook associated with a second CORESET pool index configured for the UE. The apparatus may include means for receiving, in the second slot, the first HARQ-ACK codebook associated with the first CORESET pool index, in connection with the HARQ-ACK codebook to be retransmitted in the second slot being the first HARQ-ACK codebook.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
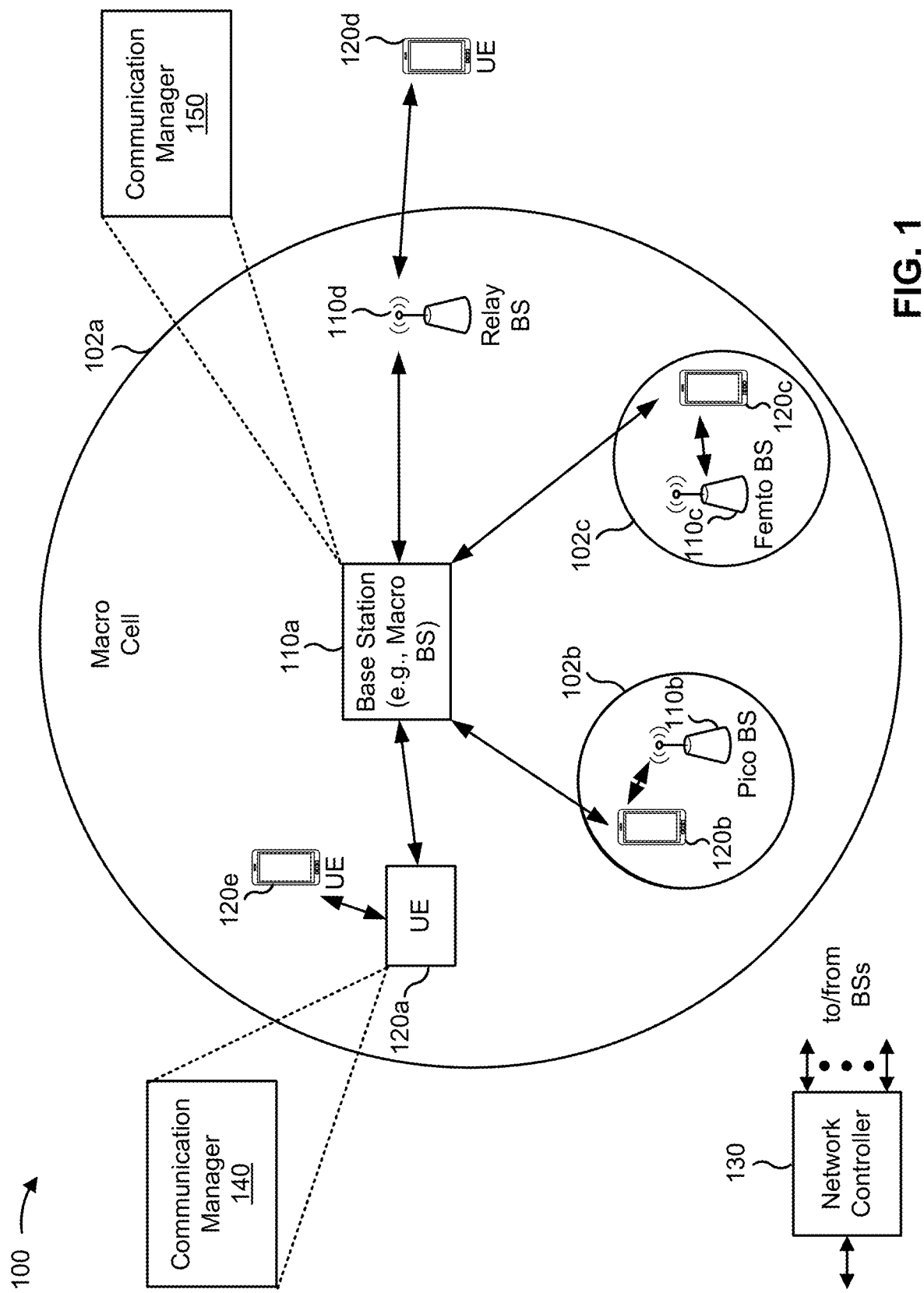
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes in the wireless network 100 through various types of backhaul interfaces, such as a direct physical connection or a virtual network, using any suitable transport network.

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the base station 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a base station 110 or a UE 120) and send a transmission of the data to a downstream node (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay network node, a relay node, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link or a midhaul communication link. The base stations 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, in a control resource set (CORESET) associated with a first CORESET pool index or a second CORESET pool index, downlink control information (DCI) including an indication that a hybrid automatic repeat request acknowledgement (HARQ-ACK) codebook scheduled in a first slot is to be retransmitted in a second slot; and transmit, in the second slot and in connection with receiving the DCI, a first HARQ-ACK codebook associated with the first CORESET pool index or a second HARQ-ACK codebook associated with the second CORESET pool index. Additionally, or alternatively, the communication manager 140 may perform one or more other operations described herein.

In some aspects, a network entity (e.g., a base station 110, a TRP, or one or more components described in connection with FIG. 3) may include a communication manager 150. As described in more detail elsewhere herein, the communication manager 150 may transmit, in a CORESET associated with a first CORESET pool index configured for a UE, DCI including an indication that a HARQ-ACK codebook scheduled in a first slot is to be retransmitted in a second slot, wherein the HARQ-ACK codebook to be retransmitted in the second slot is one of a first HARQ-ACK codebook associated with the first CORESET pool index or a second HARQ-ACK codebook associated with a second CORESET pool index configured for the UE. Additionally, or alternatively, the communication manager 150 may perform one or more other operations described herein.

As indicated above, FIG. 1 is provided as an example. Other examples may differ from what is described with regard to FIG. 1.

Figure 2:
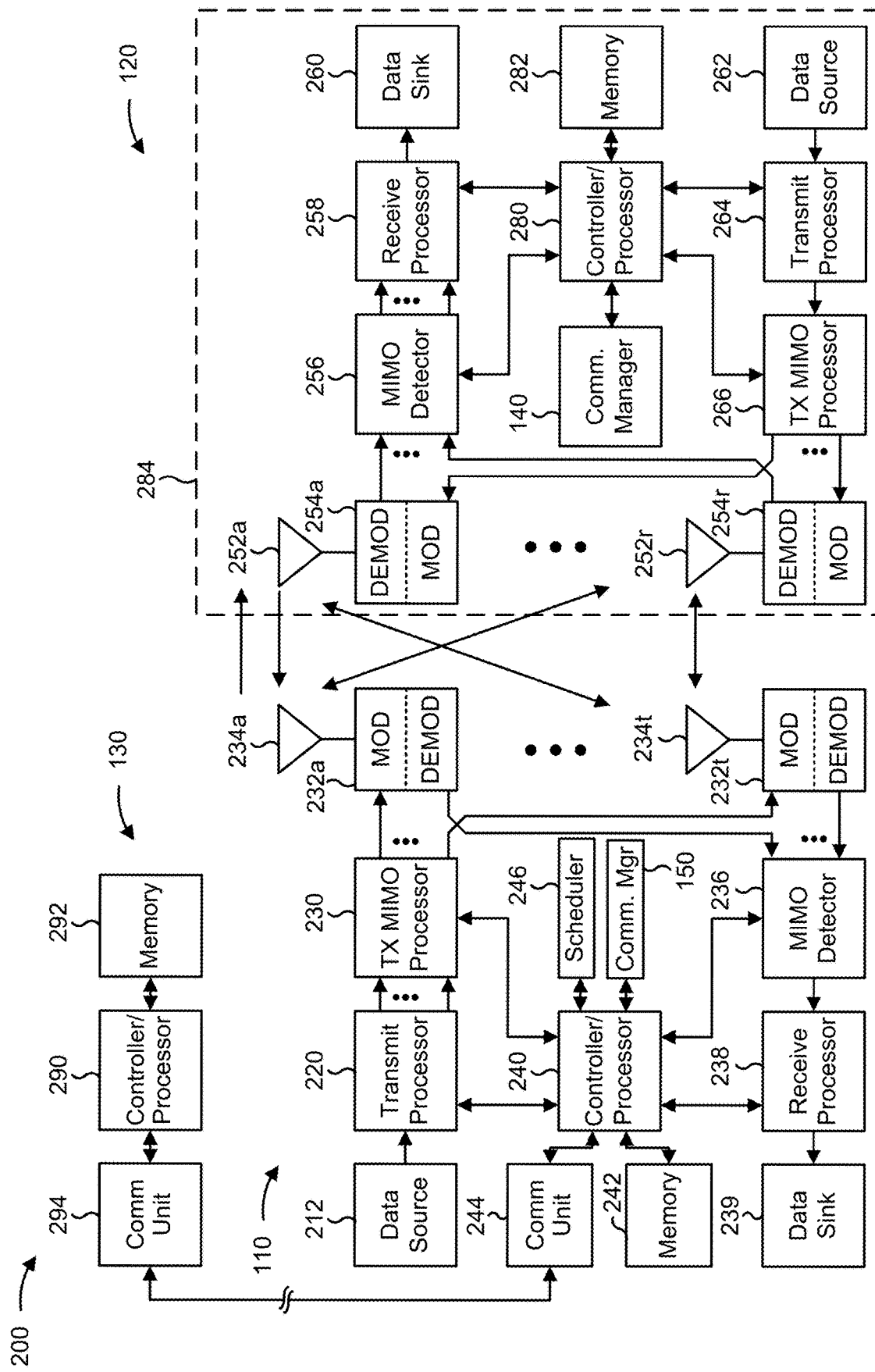
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T>1). The UE 120 may be equipped with a set of antennas 252a through 252r, such as R antennas (R>1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 9-15).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 9-15).

The controller/processor 240 of the base station 110, the controller/processor 280 of the UE 120, and/or any other component(s) of FIG. 2 may perform one or more techniques associated with HARQ-ACK codebook retransmission for multi-DCI based multi-TRP, as described in more detail elsewhere herein. For example, the controller/processor 240 of the base station 110, the controller/processor 280 of the UE 120, and/or any other component(s) of FIG. 2 may perform or direct operations of, for example, process 1200 of FIG. 12, process 1300 of FIG. 13, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1200 of FIG. 12, process 1300 of FIG. 13, and/or other processes as described herein. In some examples, executing instructions may include running the instructions, converting the instructions, compiling the instructions, and/or interpreting the instructions, among other examples. In some aspects, a network entity described herein is the base station 110, is included in the base station 110, or includes one or more components of the base station 110 shown in FIG. 2. In some aspects, a TRP described herein is the base station 110, is included in the base station 110, or includes one or more components of the base station 110 shown in FIG. 2.

In some aspects, the UE 120 includes means for receiving, in a CORESET associated with a first CORESET pool index or a second CORESET pool index, DCI including an indication that a HARQ-ACK codebook scheduled in a first slot is to be retransmitted in a second slot; and/or means for transmitting, in the second slot and in connection with receiving the DCI, a first HARQ-ACK codebook associated with the first CORESET pool index or a second HARQ-ACK codebook associated with the second CORESET pool index. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network entity includes means for transmitting, in a CORESET associated with a first CORESET pool index configured for a UE, DCI including an indication that a HARQ-ACK codebook scheduled in a first slot is to be retransmitted in a second slot, wherein the HARQ-ACK codebook to be retransmitted in the second slot is one of a first HARQ-ACK codebook associated with the first CORESET pool index or a second HARQ-ACK codebook associated with a second CORESET pool index configured for the UE. In some aspects, the network entity further includes means for receiving, in the second slot, the first HARQ-ACK codebook associated with the first CORESET pool index, in connection with the HARQ-ACK codebook to be retransmitted in the second slot being the first HARQ-ACK codebook. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
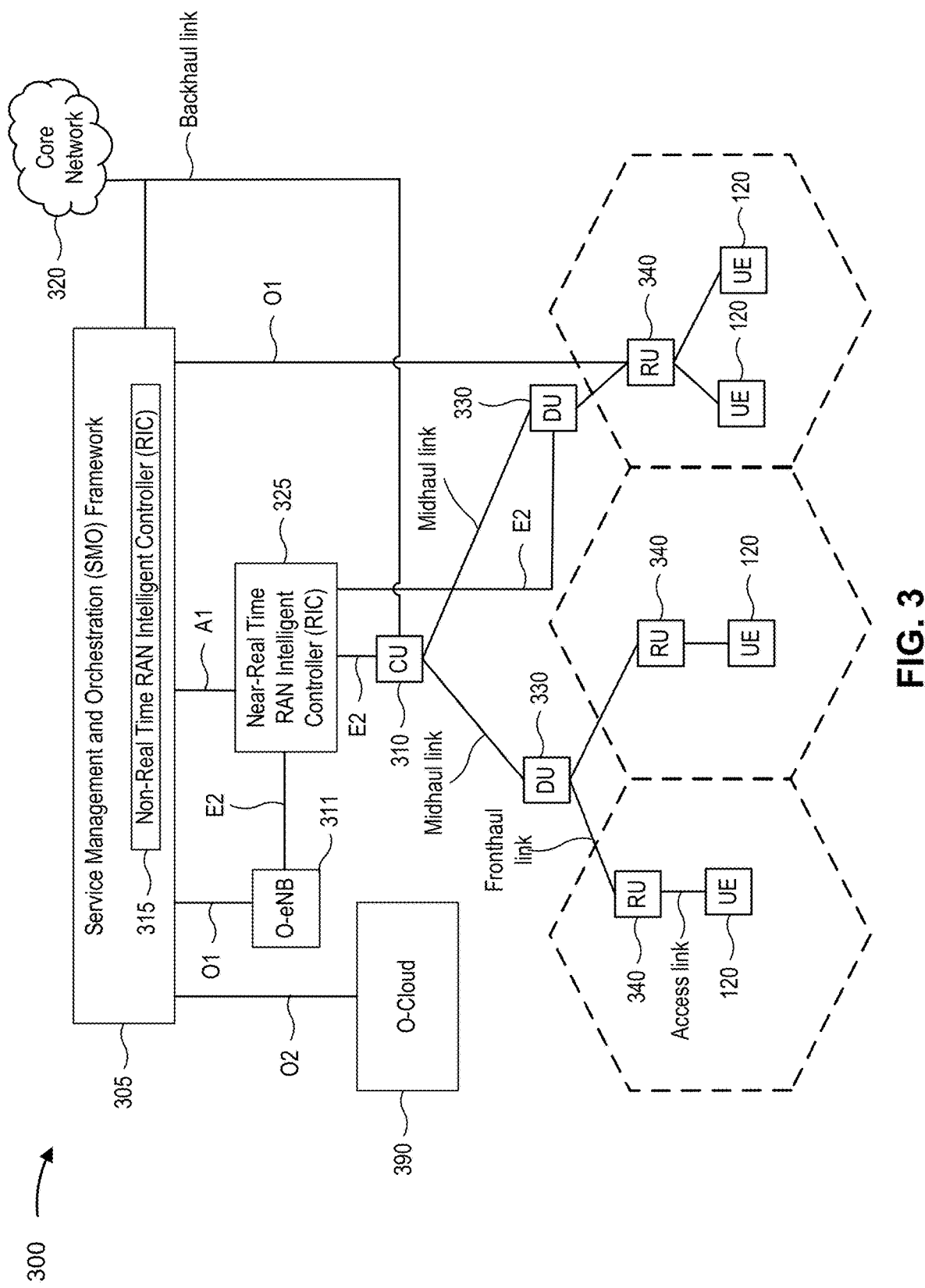
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
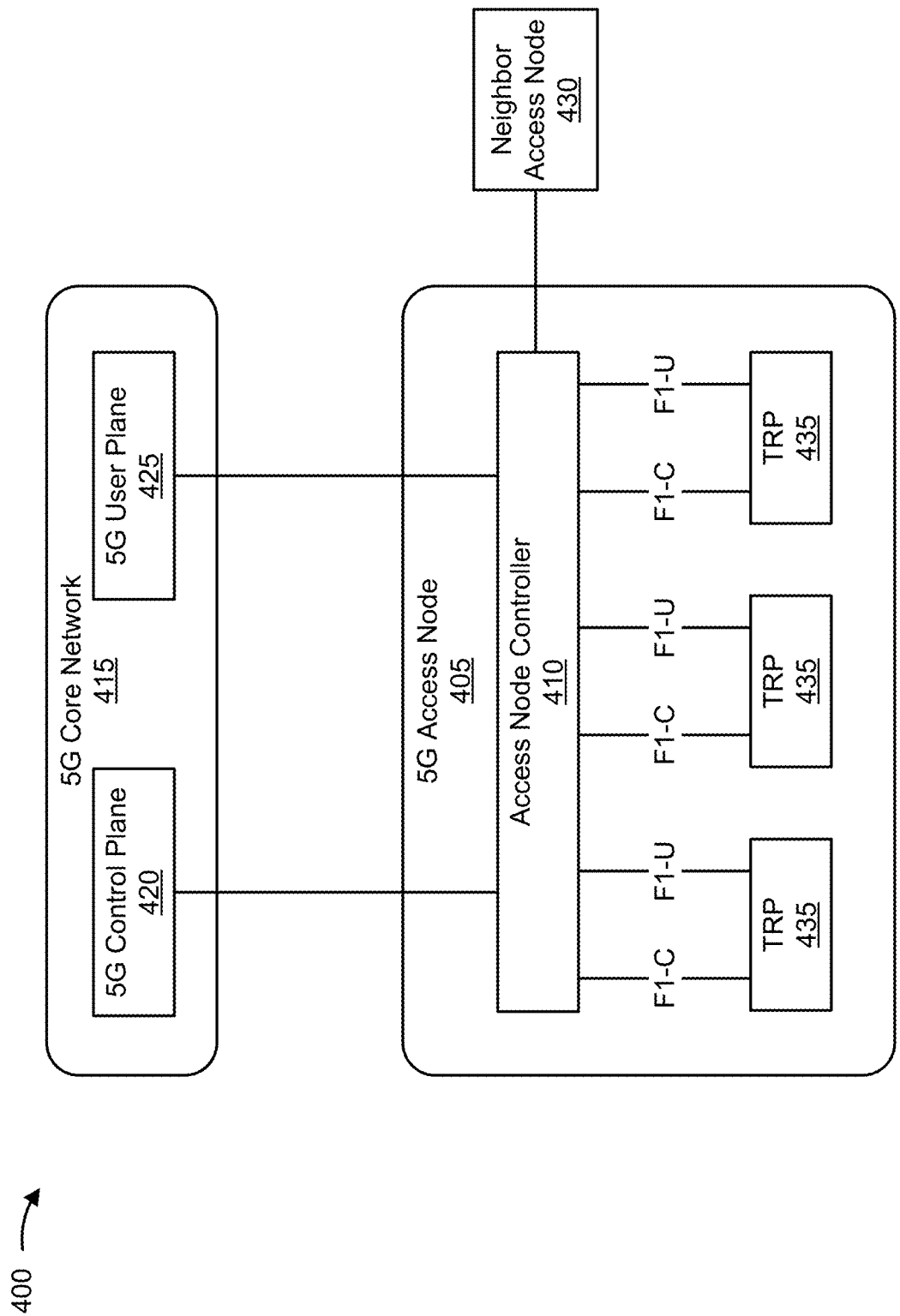
FIG. 4 is a diagram illustrating an example logical architecture of a distributed radio access network (RAN), in accordance with the present disclosure.

FIG. 4 is a diagram illustrating an example logical architecture of a distributed RAN 400, in accordance with the present disclosure.

A 5G access node 405 may include an access node controller 410. The access node controller 410 may be a CU of the distributed RAN 400. In some aspects, a backhaul interface to a 5G core network 415 may terminate at the access node controller 410. The 5G core network 415 may include a 5G control plane component 420 and a 5G user plane component 425 (e.g., a 5G gateway), and the backhaul interface for one or both of the 5G control plane and the 5G user plane may terminate at the access node controller 410. Additionally, or alternatively, a backhaul interface to one or more neighbor access nodes 430 (e.g., another 5G access node 405 and/or an LTE access node) may terminate at the access node controller 410.

The access node controller 410 may include and/or may communicate with one or more TRPs 435 (e.g., via an F1 Control (F1-C) interface and/or an F1 User (F1-U) interface). A TRP 435 may be a DU of the distributed RAN 400. In some aspects, a TRP 435 may correspond to a base station 110 described above in connection with FIG. 1. For example, different TRPs 435 may be included in different base stations 110. Additionally, or alternatively, multiple TRPs 435 may be included in a single base station 110. In some aspects, a base station 110 may include a CU (e.g., access node controller 410) and/or one or more DUs (e.g., one or more TRPs 435). In some cases, a TRP 435 may be referred to as a cell, a panel, an antenna array, or an array.

A TRP 435 may be connected to a single access node controller 410 or to multiple access node controllers 410. In some aspects, a dynamic configuration of split logical functions may be present within the architecture of distributed RAN 400. For example, a PDCP layer, an RLC layer, and/or a MAC layer may be configured to terminate at the access node controller 410 or at a TRP 435.

In some aspects, multiple TRPs 435 may transmit communications (e.g., the same communication or different communications) in the same transmission time interval (TTI) (e.g., a slot, a mini-slot, a subframe, or a symbol) or different TTIs using different quasi co-location (QCL) relationships (e.g., different spatial parameters, different transmission configuration indicator (TCI) states, different precoding parameters, and/or different beamforming parameters). In some aspects, a TCI state may be used to indicate one or more QCL relationships. A TRP 435 may be configured to individually (e.g., using dynamic selection) or jointly (e.g., using joint transmission with one or more other TRPs 435) serve traffic to a UE 120.

As indicated above, FIG. 4 is provided as an example. Other examples may differ from what was described with regard to FIG. 4.

Figure 5:
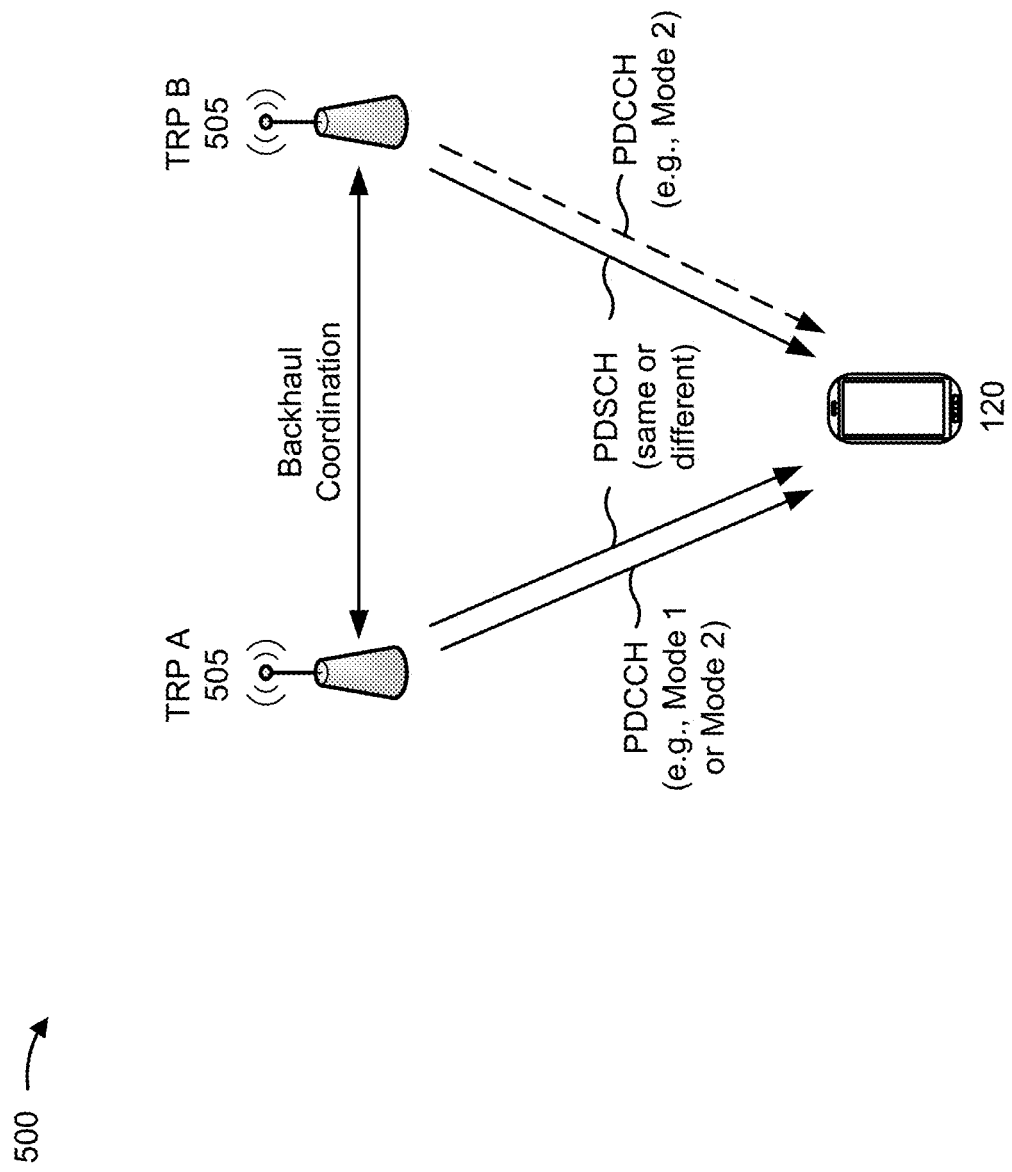
FIG. 5 is a diagram illustrating an example of multiple transmit receive point (multi-TRP) communication, in accordance with the present disclosure.

FIG. 5 is a diagram illustrating an example 500 of multi-TRP communication (sometimes referred to as multi-panel communication), in accordance with the present disclosure. As shown in FIG. 5, multiple TRPs 505 may communicate with the same UE 120. A TRP 505 may correspond to a TRP 435 described above in connection with FIG. 4.

The multiple TRPs 505 (shown as TRP A and TRP B) may communicate with the same UE 120 in a coordinated manner (e.g., using coordinated multipoint transmissions) to improve reliability and/or increase throughput. The TRPs 505 may coordinate such communications via an interface between the TRPs 505 (e.g., a backhaul interface and/or an access node controller 410). The interface may have a smaller delay and/or higher capacity when the TRPs 505 are co-located at the same base station 110 (e.g., when the TRPs 505 are different antenna arrays or panels of the same base station 110), and may have a larger delay and/or lower capacity (as compared to co-location) when the TRPs 505 are located at different base stations 110. The different TRPs 505 may communicate with the UE 120 using different QCL relationships (e.g., different TCI states), different DMRS ports, and/or different layers (e.g., of a multi-layer communication).

In a first multi-TRP transmission mode (e.g., Mode 1), a single physical downlink control channel (PDCCH) may be used to schedule downlink data communications for a single physical downlink shared channel (PDSCH). In this case, multiple TRPs 505 (e.g., TRP A and TRP B) may transmit communications to the UE 120 on the same PDSCH. For example, a communication may be transmitted using a single codeword with different spatial layers for different TRPs 505 (e.g., where one codeword maps to a first set of layers transmitted by a first TRP 505 and maps to a second set of layers transmitted by a second TRP 505). As another example, a communication may be transmitted using multiple codewords, where different codewords are transmitted by different TRPs 505 (e.g., using different sets of layers). In either case, different TRPs 505 may use different QCL relationships (e.g., different TCI states) for different DMRS ports corresponding to different layers. For example, a first TRP 505 may use a first QCL relationship or a first TCI state for a first set of DMRS ports corresponding to a first set of layers, and a second TRP 505 may use a second (different) QCL relationship or a second (different) TCI state for a second (different) set of DMRS ports corresponding to a second (different) set of layers. In some aspects, a TCI state in DCI (e.g., transmitted on the PDCCH, such as DCI format 1_0 or DCI format 1_1) may indicate the first QCL relationship (e.g., by indicating a first TCI state) and the second QCL relationship (e.g., by indicating a second TCI state). The first and the second TCI states may be indicated using a TCI field in the DCI. In general, the TCI field can indicate a single TCI state (for single-TRP transmission) or multiple TCI states (for multi-TRP transmission as discussed here) in this multi-TRP transmission mode (e.g., Mode 1).

In a second multi-TRP transmission mode (e.g., Mode 2), multiple PDCCHs may be used to schedule downlink data communications for multiple corresponding PDSCHs (e.g., one PDCCH for each PDSCH). In this case, a first PDCCH may schedule a first codeword to be transmitted by a first TRP 505, and a second PDCCH may schedule a second codeword to be transmitted by a second TRP 505. Furthermore, first DCI (e.g., transmitted by the first TRP 505) may schedule a first PDSCH communication associated with a first set of DMRS ports with a first QCL relationship (e.g., indicated by a first TCI state) for the first TRP 505, and second DCI (e.g., transmitted by the second TRP 505) may schedule a second PDSCH communication associated with a second set of DMRS ports with a second QCL relationship (e.g., indicated by a second TCI state) for the second TRP 505. In this case, DCI (e.g., having DCI format 1_0 or DCI format 1_1) may indicate a corresponding TCI state for a TRP 505 corresponding to the DCI. The TCI field of the DCI indicates the corresponding TCI state (e.g., the TCI field of the first DCI indicates the first TCI state and the TCI field of the second DCI indicates the second TCI state). The second multi-TRP transmission mode (e.g., Mode 2) may also be referred to as "multi-DCI based multi-TRP."

As indicated above, FIG. 5 is provided as an example. Other examples may differ from what is described with respect to FIG. 5.

Figure 6:
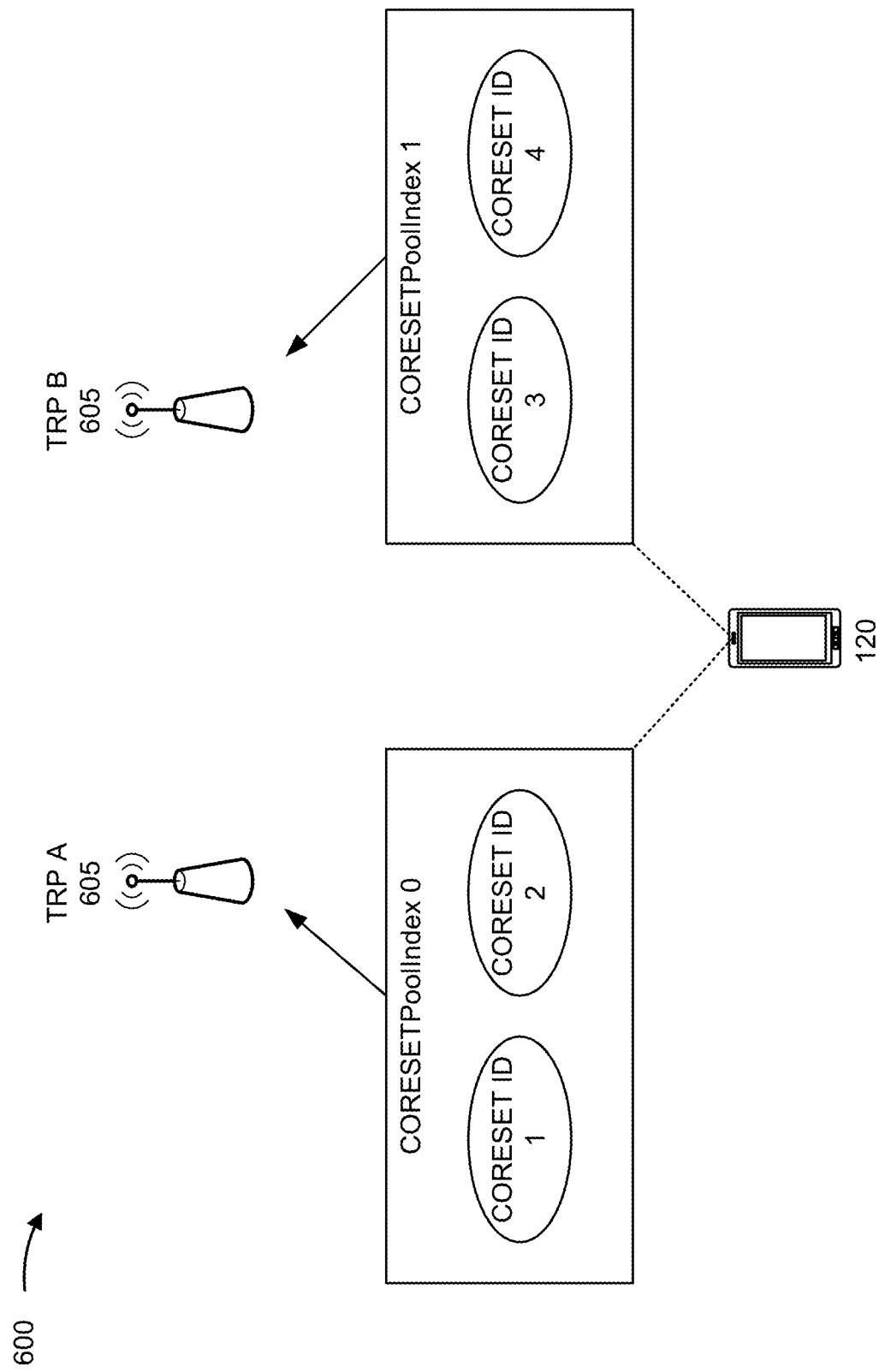
FIG. 6 is a diagram illustrating an example of TRP differentiation at a UE based at least in part on a control resource set (CORESET) pool index, in accordance with the present disclosure.

FIG. 6 is a diagram illustrating an example 600 of TRP differentiation at a UE based at least in part on a CORESET pool index, in accordance with the present disclosure. In some aspects, a CORESET pool index (or CORESET-PoolIndex) value may be used by a UE (e.g., UE 120) to identify a TRP associated with an uplink grant received on a PDCCH.

"CORESET" may refer to a control region that is structured to support an efficient use of resources, such as by flexible configuration or reconfiguration of resources for one or more PDCCHs associated with a UE. In some aspects, a CORESET may occupy the first symbol of an orthogonal frequency division multiplexing (OFDM) slot, the first two symbols of an OFDM slot, or the first three symbols of an OFDM slot. Thus, a CORESET may include multiple resource blocks (RBs) in the frequency domain, and either one, two, or three symbols in the time domain. In 5G, a quantity of resources included in a CORESET may be flexibly configured, such as by using RRC signaling to indicate a frequency domain region (for example, a quantity of RBs) or a time domain region (for example, a quantity of symbols) for the CORESET.

As illustrated in FIG. 6, a UE 120 may be configured with multiple CORESETs in a given serving cell. Each CORESET configured for the UE 120 may be associated with a CORESET identifier (CORESET ID). For example, a first CORESET configured for the UE 120 may be associated with CORESET ID 1, a second CORESET configured for the UE 120 may be associated with CORESET ID 2, a third CORESET configured for the UE 120 may be associated with CORESET ID 3, and a fourth CORESET configured for the UE 120 may be associated with CORESET ID 4.

As further illustrated in FIG. 6, two or more (for example, up to five) CORESETs may be grouped into a CORESET pool. Each CORESET pool may be associated with a CORESET pool index. As an example, CORESET ID 1 and CORESET ID 2 may be grouped into CORESET pool index 0, and CORESET ID 3 and CORESET ID 4 may be grouped into CORESET pool index 1. In a multi-TRP configuration, each CORESET pool index value may be associated with a particular TRP 605. As an example, and as illustrated in FIG. 6, a first TRP 605 (TRP A) may be associated with CORESET pool index 0 and a second TRP 605 (TRP B) may be associated with CORESET pool index 1. The UE 120 may be configured by a higher layer parameter, such as PDCCH-Config, with information identifying an association between a TRP and a CORESET pool index value assigned to the TRP. Accordingly, the UE 120 may identify the TRP that transmitted DCI to the UE 120 by determining the CORESET ID of the CORESET in which the PDCCH carrying the DCI was transmitted, determining the CORESET pool index value associated with the CORESET pool in which the CORESET ID is included, and identifying the TRP associated with the CORESET pool index value. Multi-TRP operation may be defined for the UE 120 in a given component carrier (CC) by configuring two CORESET pool index values in different CORESETs in an active bandwidth part (BWP) of the CC. In some examples, if a CORESET is not configured with a CORESET pool index value, a CORESET pool index value of 0 may be assumed for that CORESET.

As indicated above, FIG. 6 is provided as an example. Other examples may differ from what is described with respect to FIG. 6.

Figure 7:
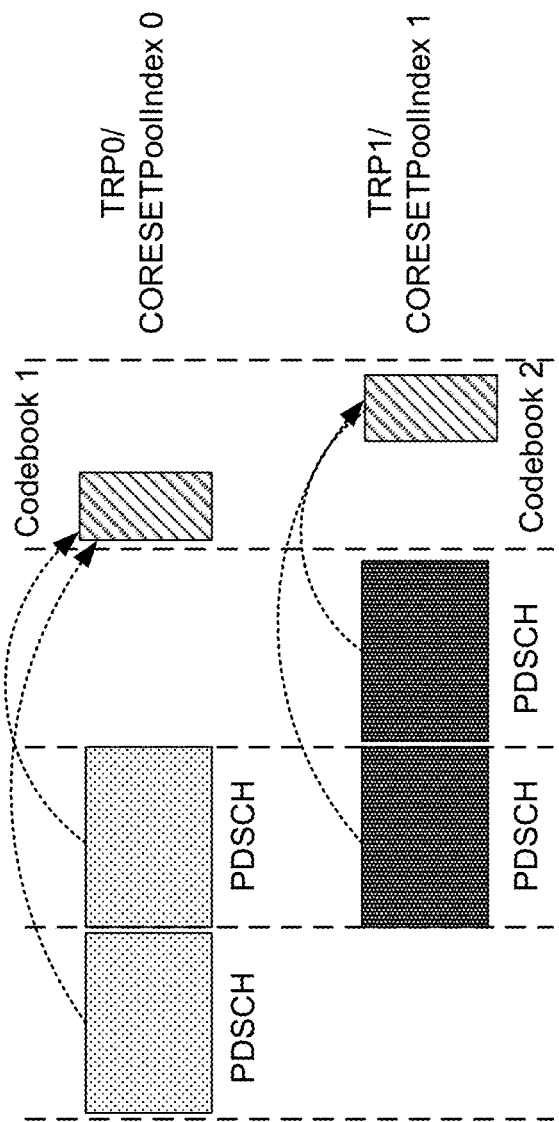
FIG. 7 is a diagram illustrating an example of a separate hybrid automatic repeat request (HARQ) feedback mode for multiple downlink control information (multi-DCI) based multi-TRP, in accordance with the present disclosure.

FIG. 7 is a diagram illustrating an example 700 of a separate hybrid automatic repeat request (HARQ) feedback mode for multi-DCI based multi-TRP, in accordance with the present disclosure. In some examples, a UE may be configured in a joint HARQ feedback mode or a separate HARQ feedback mode for multi-DCI based multi-TRP. In the joint HARQ feedback mode, joint acknowledgement (ACK) and/or negative acknowledgement (NACK) (ACK/NACK) feedback for downlink communications (e.g., PDSCH communications) from different TRPs may be carried on the same physical uplink control channel (PUCCH) resource.

As shown in FIG. 7, in the separate HARQ feedback mode, ACK/NACK feedback for downlink communications (e.g., PDSCH communications) from different TRPs may be carried on different PUCCH resources. In some examples, in a case in which a UE is configured with at least one CORESET associated with a first CORESET pool index value and at least one CORESET associated with a second CORESET pool index value (e.g., the UE is configured for multi-DCI based multi-TRP), an RRC parameter ackNack-FeedbackMode may indicate that the separate HARQ feedback mode (e.g., ackNackFeedbackMode=separate) is configured for a cell group (e.g., a group of downlink CCs with HARQ-ACK in the same PUCCH cell). In this case, the UE separately performs HARQ-ACK reporting procedures for the first CORESET pool index (e.g., CORESET pool index 0) and the separate CORESET pool index (e.g., CORESET pool index 1). CCs that are not configured with a CORESET pool index value may be assumed to be part of CORESET pool index 0. CCs that are configured with two CORESET pool index values may be considered two times for HARQ-ACK reporting.

As shown in FIG. 7, a UE may receive PDSCH communications associated with a first CORESET pool index value (CORESET pool index 0) and PDSCH communications associated with a second CORESET pool index value (CORESET pool index 1). The PDSCH communications associated with CORESET pool index 0 may be received from a first TRP (TRP0), and the PDSCH communications associated with CORESET pool index 1 may be received from a second TRP (TRP1). In the separate HARQ feedback mode, the UE may transmit ACK/NACK feedback for the PDSCH communications associated with CORESET pool index 0 in a first HARQ-ACK codebook (Codebook 1), and the UE may transmit ACK/NACK feedback for the PDSCH communications associated with CORESET pool index 1 in a second HARQ-ACK codebook (Codebook 2). The UE may use first PUCCH resources to transmit Codebook 1 (e.g., to TRP0), and the UE may use second PUCCH resources to transmit Codebook 2 (e.g., to TRP1). In some examples, as shown in FIG. 7, the first PUCCH resources for transmitting Codebook 1 (e.g., including HARQ-ACK for CORESET pool index 0) and the second PUCCH resources for transmitting Codebook 2 (e.g., including HARQ-ACK for CORESET pool index 1) may be in the same slot, but may not overlap in the time domain.

As indicated above, FIG. 7 is provided as an example. Other examples may differ from what is described with respect to FIG. 7.

Figure 8:
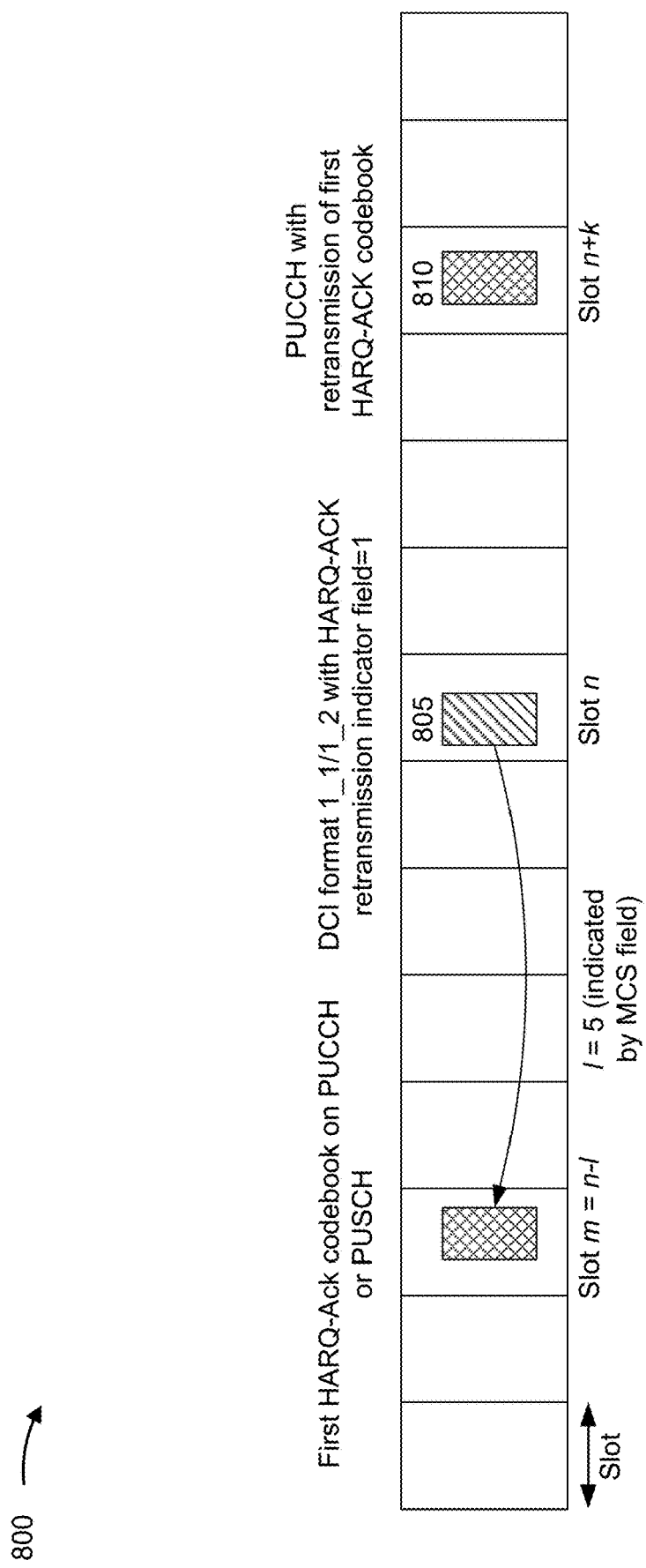
FIG. 8 is a diagram illustrating an example of HARQ acknowledgement (HARQ-ACK) codebook retransmission, in accordance with the present disclosure.

FIG. 8 is a diagram illustrating an example 800 of HARQ-ACK codebook retransmission, in accordance with the present disclosure.

In some aspects, DCI (e.g., DCI format 1_1 or DCI format 1_2) may trigger retransmission of a previously scheduled HARQ-ACK codebook. The DCI format (e.g., DCI format 1_1 or DCI format 1_2) may be configured with a one-bit field (e.g., a "HARQ-ACK retransmission indicator field") that may be set to a value of 1 to indicate that the DCI is being used to trigger HARQ-ACK codebook retransmission. In this case, when the HARQ-ACK retransmission indicator field (e.g., is set to 1), the DCI does not schedule a PDSCH communication, but instead triggers retransmission of a HARQ-ACK codebook that the UE has transmitted, would have transmitted (e.g., the scheduled HARQ-ACK codebook transmission is canceled or dropped), or is scheduled to transmit in a previously scheduled PUCCH or physical uplink shared channel (PUSCH) communication. As shown in FIG. 8, and by reference number 805, the UE may receive the DCI that indicates HARQ-ACK codebook retransmission (e.g., DCI format 1_1/1_2 with the HARQ-ACK retransmission field set to 1) in slot n, and the DCI may trigger retransmission of a first HARQ-ACK codebook scheduled in slot m. The DCI may indicate an offset l between the slot m in which the first HARQ-ACK codebook book is scheduled and the slot n in which the DCI is received. That is, the slot m may be determined as m=n−l. The value of l may be within a certain range (e.g., $\{-7, -6, \ldots, 23, 24\}$). In some examples, the MCS field in the DCI may be used to indicate the value of l, as the MCS field is not needed to indicate an MCS because no PDSCH communication is scheduled by the DCI.

In some cases, the slot m may be before the slot n in which the DCI is received. In such cases, the UE may have transmitted the HARQ-ACK codebook that was scheduled in slot m or the UE may have dropped or canceled the transmission of the HARQ-ACK codebook. In some cases, the slot m may be after the slot n in which the DCI is received (e.g., when the value of l indicated in the DCI is negative). In this case, the DCI may trigger retransmission of a HARQ-ACK codebook scheduled to be transmitted in a future PUCCH or PUSCH communication. The DCI may indicate an offset k between the slot n in which the DCI is received and a slot n+k in which the HARQ-ACK codebook is to be retransmitted. In some examples, the DCI may indicate the value of k in a K1 field (e.g., a "PDSCH-to-HARQ feedback timing indicator" field) of the DCI. In a case in which the slot m is after the slot n, the slot n+k may be after the slot m. As shown by reference number 810, in slot n+k, the UE may transmit (e.g., re-transmit) the first PUCCH codebook scheduled in slot m. In some examples, the priority of the PUCCH/PUSCH with the first HARQ-ACK in slot m may be the same as the value of the priority indicator field of the DCI. In some examples, if sub-slot based PUCCH and HARQ-ACK is configured for the UE, the slots and offsets n, m, l, and k may refer to sub-slots and sub-slot offsets.

As indicated above, FIG. 8 is provided as an example. Other examples may differ from what is described with respect to FIG. 8.

In some examples, resources for transmitting only one HARQ-ACK codebook may be scheduled in one slot or one sub-slot. Thus, for HARQ-ACK codebook retransmission triggered by DCI, as described above in connection with FIG. 8, indicating the slot m (e.g., by indicating the offset l in the DCI) may uniquely identify the HARQ-ACK to be retransmitted. However, if a UE is configured with multi-DCI based multi-TRP (e.g., the UE is configured with two CORESET pool index values) and separate HARQ feedback (e.g., ackNackFeedbackMode=separate), there may be two HARQ-ACK codebooks (corresponding to the two CORESET pool index values) scheduled in the same slot. In this case, indicating the slot m in DCI that triggers HARQ-ACK codebook retransmission may not be sufficient to identify the HARQ-ACK codebook to be transmitted, as there may be two HARQ-ACK codebooks scheduled in slot m. This may result in confusion between the UE and the network (e.g., the TRPs) as to which HARQ-ACK codebook is to be retransmitted when the DCI that triggers HARQ-ACK codebook is received by the UE. As a result, reliability of the HARQ-ACK retransmission may be decreased.

Some techniques and apparatuses described herein enable a UE to receive, in a CORESET associated with a first CORESET pool index or a second CORESET pool index, DCI including an indication that a HARQ-ACK codebook scheduled in a first slot is to be retransmitted in a second slot. The UE may transmit, in the second slot, the first HARQ-ACK codebook associated with the first CORESET pool index or the second HARQ-ACK codebook associated with the second CORESET pool index. In some aspects, the UE may determine whether to transmit the first HARQ-ACK codebook or the second HARQ-ACK codebook, based at least in part on the CORESET in which the DCI is received, which of the first HARQ-ACK codebook and/or the second HARQ-ACK codebook is/are scheduled in the first slot, and/or an indication included in the DCI. As a result, confusion between the UE and the network as to which HARQ-ACK codebook is to be retransmitted may be avoided, and reliability of the HARQ-ACK codebook retransmission may be increased.

Figure 9:
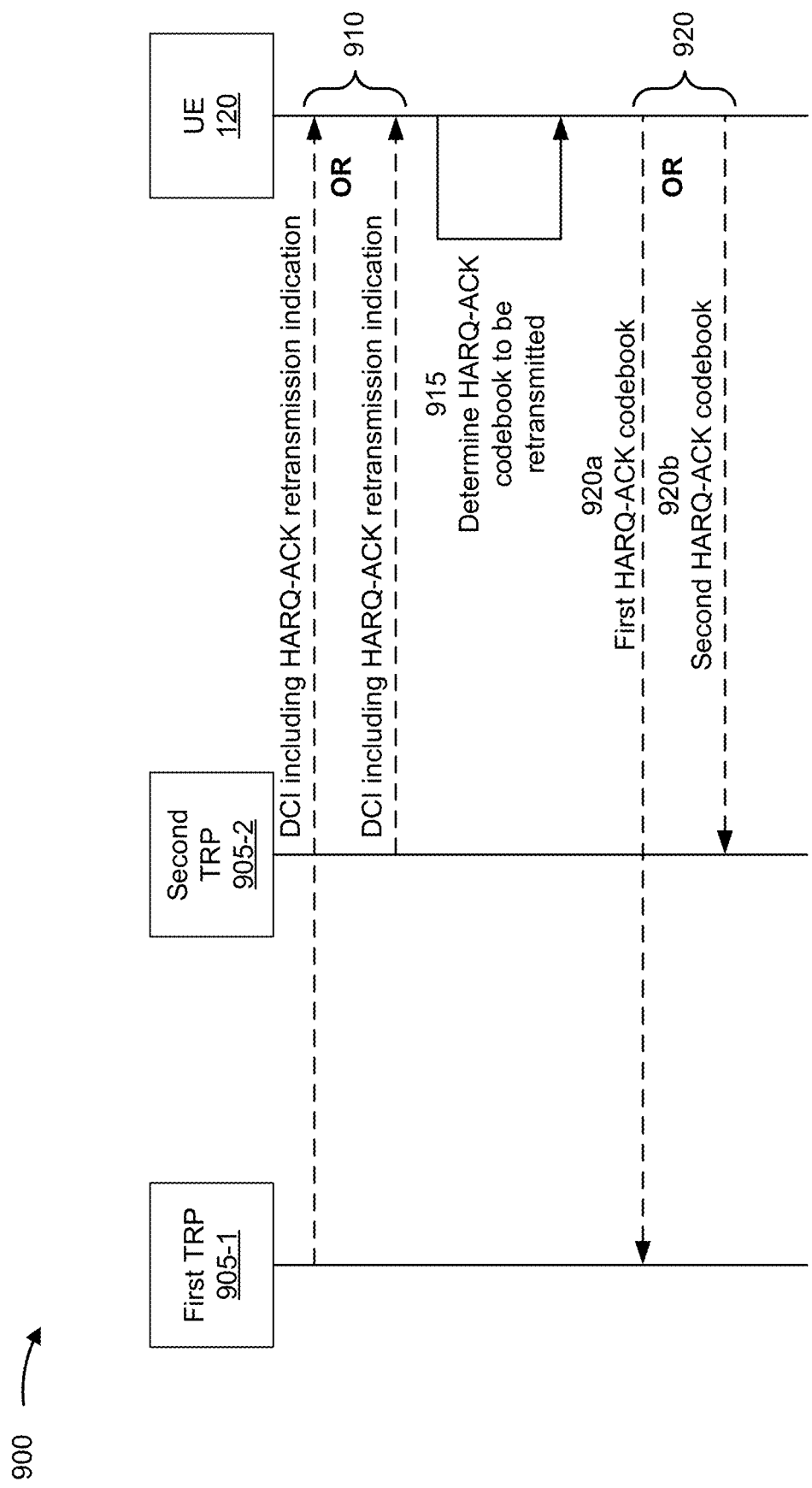
FIGS. 9-11 are diagrams illustrating examples associated with HARQ-ACK codebook retransmission for multi-DCI based multi-TRP, in accordance with the present disclosure.

FIG. 9 is a diagram illustrating an example 900 associated with HARQ-ACK codebook retransmission for multi-DCI based multi-TRP, in accordance with the present disclosure. As shown in FIG. 9, example 900 includes a first TRP 905-1, a second TRP 905-2, and a UE 120. In some aspects, the TRPs 905 and UE 120 may be included in a wireless network, such as wireless network 100. The TRPs 905 and the UE 120 may communicate via a wireless access link, which may include an uplink and a downlink.

In some aspects, the TRPs 905 may communicate with the UE 120 using multi-DCI based multi-TRP communications. In some aspects, the first TRP 905-1 may be associated with a first CORESET pool index (e.g., CORESET pool index 0), and the second TRP 905-2 may be associated with a second CORESET pool index (e.g., CORESET pool index 1). The UE 120 may be configured with one or more CORESETs associated with the first CORESET pool index (e.g., CORESET pool index 0) and one or more CORESETs associated with the second CORESET pool index (e.g., CORESET pool index 1). In some aspects, the UE 120 may be configured with separate HARQ feedback reporting for the first CORESET pool index (e.g., CORESET pool index 0) and the second CORESET pool index (e.g., CORESET pool index 1). For example, the UE 120 may be configured with a separate HARQ feedback mode (e.g., ackNackFeedbackMode=separate) for multi-DCI based multi-TRP.

As shown in FIG. 9, and by reference number 910, the UE 120 may receive DCI including a HARQ-ACK retransmission indication for the first TRP 905-1 or the second TRP 905-2. In some aspects, the first TRP 905-1 may transmit, and the UE 120 may receive, the DCI including the HARQ-ACK retransmission indication in a CORESET associated with the first CORESET pool index. In some aspects, the second TRP 905-2 may transmit, and the UE 120 may receive, the DCI including the HARQ-ACK retransmission indication in a CORESET associated with the second CORESET pool index.

The DCI may include an indication that a HARQ-ACK codebook scheduled in a first slot (m) is to be retransmitted in a second slot (n+k). The DCI may be received in a third slot (n). The DCI may be DCI format 1_1 or DCI format 1_2 that includes a HARQ-retransmission indicator field with a value of 1. The DCI may include an indication of a first offset l between slot m and slot n. The UE 120 may determine the slot m in which the HARQ-ACK codebook to be retransmitted is scheduled from the offset l as m=n−l. In some aspects, the offset l may be indicated in the MCS field in the DCI. The value of l may be within in a range (e.g., between {−7, −6, . . . , 23, 24}) associated with the offset l. For example, a positive value of l may indicate that the HARQ-ACK codebook to be retransmitted was scheduled in a slot m that is prior to the slot n in which the DCI is received. A negative value of l may indicate that the HARQ-ACK codebook to be retransmitted is scheduled in a slot m that is after the slot n in which the DCI is received.

The DCI may include an indication of a second offset k between the slot n in which the DCI is received and the slot n+k in which the HARQ-ACK codebook is to be retransmitted. In some aspects, the value of k may be indicated in the K1 field (e.g., the PDSCH-to-HARQ feedback timing indicator field) of the DCI. In a case in which the slot m is after the slot n, the slot n+k may be after the slot m.

As further shown in FIG. 9, and by reference number 915, the UE 120 may determine the HARQ-ACK codebook to be retransmitted in connection with receiving the DCI. The DCI indicates that a HARQ codebook scheduled in the slot m is to be retransmitted in slot n+k. In some aspects, because the UE 120 is configured with multi-DCI based multi-TRP, a first HARQ-ACK codebook associated with the first CORESET pool index and/or a second HARQ-ACK codebook associated with the second CORESET pool index may be scheduled in the slot m. For example, both the first and second HARQ-ACK codebooks may be scheduled (e.g., in respective PUCCH or PUSCH resources) in the slot m, or a single one of the first HARQ-ACK codebook or the second HARQ-ACK codebook may be scheduled in the slot m. The UE 120, in connection with receiving the DCI, may determine which of the first HARQ-ACK codebook associated with the first CORESET pool index or the second HARQ-ACK codebook associated with the second CORESET pool index is to be retransmitted in the slot n+k.

In some aspects, the UE 120 may determine the HARQ-ACK codebook to be retransmitted based at least in part on the CORESET pool index value of the CORESET in which the DCI is received. In this case, the UE 120 may determine that the HARQ-ACK codebook to be retransmitted is the HARQ-ACK codebook, scheduled in the slot m, that is associated with the same CORESET pool index as the CORESET in which the DCI is received. For example, if the DCI is received (e.g., from the first TRP 905-1) in a CORESET associated with the first CORESET pool index, the UE 120 may determine that the HARQ-ACK codebook to be retransmitted is the first HARQ-ACK codebook associated with the first CORESET pool index. If the DCI is received (e.g., from the second TRP 905-2) in a CORESET associated with the second CORESET pool index, the UE 120 may determine that the HARQ-ACK codebook to be retransmitted is the second HARQ-ACK codebook associated with the second CORESET pool index.

In some aspects, the UE 120 may determine whether one HARQ-ACK codebook (e.g., the first or second HARQ-ACK codebook) is scheduled in the slot m or both HARQ-ACK codebooks (e.g., the first and second HARQ-ACK codebook) are scheduled in slot m. When only a single HARQ-ACK codebook is scheduled in the slot m, the UE 120 may determine that the single HARQ-ACK codebook scheduled in the slot m (e.g., the first HARQ-ACK codebook or the second HARQ-ACK codebook) is the HARQ-ACK codebook to be retransmitted. When both the first and second HARQ-ACK codebooks are scheduled in the slot m, the UE 120 may determine that the HARQ-ACK codebook to be transmitted is the HARQ-ACK codebook (e.g., the first or second HARQ-ACK codebook) associated with the same CORESET pool index as the CORESET in which the DCI is received. In this case, cross-TRP triggering may be used to trigger retransmission of a HARQ-ACK codebook when only one HARQ-ACK codebook is scheduled in a slot. For example, in a case in which only the second HARQ-ACK codebook associated with the second CORESET pool index is scheduled in the slot m, the first TRP 905-1 may transmit the DCI to the UE 120 (e.g., in a CORESET associated with the first CORESET pool index) to trigger retransmission of the second HARQ-ACK codebook.

In some aspects, the DCI may include an indication of whether the HARQ-ACK codebook to be retransmitted is associated with the first CORESET pool index or the second CORESET pool index. In this case, the UE 120 may determine whether the HARQ-ACK codebook to be retransmitted is the first HARQ-ACK codebook associated with the first CORESET pool index or the second HARQ-ACK codebook associated with the second CORESET pool index based at least in part on the indication, in the DCI, of whether the HARQ-ACK codebook to be retransmitted is associated with the first CORESET pool index or the second CORESET pool index. In some aspects, the DCI may include a one-bit indication (e.g., of the first CORESET pool index value or the second CORESET pool index value) that indicates whether the HARQ-ACK codebook to be retransmitted is associated with the first CORESET pool index or the second CORESET pool index. In some aspects, the indication of the first CORESET pool index or the second CORESET pool index for the HARQ-ACK codebook to be retransmitted may be included in an existing field of DCI format 1_1 or DCI format 1_2 that is not used when the DCI does not schedule a PDSCH communication. For example, the indication of the first CORESET pool index or the second CORESET pool index for the HARQ-ACK codebook may be included in new data indicator (NDI) field (e.g., an NDI bit), a HARQ request process number field (e.g., a first bit of the HARQ process number field), a frequency domain resource allocation (FDRA) field (e.g., a first bit of the FDRA field), a time domain resource allocation (TDRA) field (e.g., a first bit of the TDRA field), or a redundancy version (RV) field (e.g., a first bit of the RV field) of the DCI.

In some aspects, in a case in which the DCI indicates whether the HARQ-ACK codebook to be retransmitted is associated with the first CORESET pool index or the second CORESET pool index, cross-TRP triggering of HARQ-ACK codebook retransmission may be used when there is only one HARQ-ACK codebook scheduled in the slot m or when both of the first and second HARQ-ACK codebooks are scheduled in the slot m. For example, the first TRP 905-1 may transmit, to the UE 120 (e.g., in a CORESET associated with the first CORESET pool index), DCI that indicates that a HARQ-ACK codebook associated with second CORESET pool index is to be retransmitted by the UE 120. In some aspects, in a case in which the DCI indicates whether the HARQ-ACK codebook to be retransmitted is associated with the first CORESET pool index or the second CORESET pool index, the CORESET pool index of the CORESET in which the DCI is received may not be used by the UE 120 to determine which HARQ-ACK codebook scheduled in the slot m is the HARQ-ACK codebook to be retransmitted.

As further shown in FIG. 9, and by reference number 920, the UE 120 may transmit the HARQ-ACK codebook to be retransmitted in the slot n+k, based at least in part on receiving the DCI.

In some aspects, UE 120 may determine that the HARQ-ACK codebook scheduled in the slot m, to be retransmitted in slot n+k, is a first HARQ-ACK codebook associated with the first CORESET pool index. In this case, as shown by reference number 920*a*, the UE 120 may transmit the first HARQ-ACK codebook to the first TRP 905-1 in slot n+k. The first TRP 905-1 may receive the first HARQ-ACK codebook transmitted by the UE in the slot n+k. For example, the UE 120 may transmit the first HARQ-ACK codebook to the first TRP 905-1 in a PUCCH communication.

In some aspects, UE 120 may determine that the HARQ-ACK codebook scheduled in the slot m, to be retransmitted in slot n+k, is a second HARQ-ACK codebook associated with the second CORESET pool index. In this case, as shown by reference number 920*b*, the UE 120 may transmit the second HARQ-ACK codebook to the second TRP 905-2 in slot n+k. The second TRP 905-2 may receive the second HARQ-ACK codebook transmitted by the UE in the slot n+k. For example, the UE 120 may transmit the second HARQ-ACK codebook to the second TRP 905-1 in a PUCCH communication.

As described above, the UE 120 may receive, in a CORESET associated with a first CORESET pool index or a second CORESET pool index, DCI including an indication that a HARQ-ACK codebook scheduled in a first slot is to be retransmitted in a second slot. The UE 120 may transmit, in the second slot, the first HARQ-ACK codebook associated with the first CORESET pool index or the second HARQ-ACK codebook associated with the second CORESET pool index. In some aspects, the UE 120 may determine whether to transmit the first HARQ-ACK codebook or the second HARQ-ACK codebook, based at least in part on the CORESET in which the DCI is received, which of the first HARQ-ACK codebook and/or the second HARQ-ACK codebook is/are scheduled in the first slot, and/or an indication included in the DCI. As a result, confusion between the UE 120 and the network as to which HARQ-ACK codebook is to be retransmitted may be avoided, and reliability of the HARQ-ACK codebook retransmission may be increased.

As indicated above, FIG. 9 is provided as an example. Other examples may differ from what is described with respect to FIG. 9.

Figure 10:
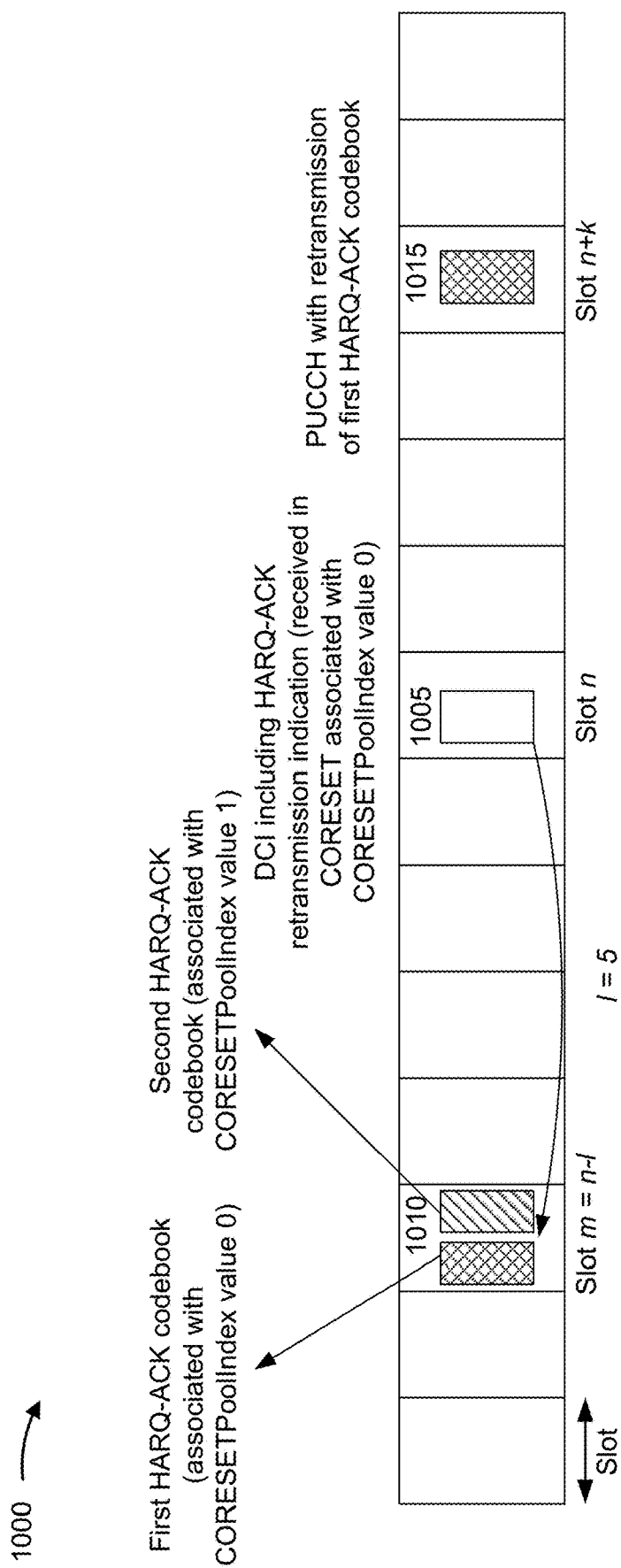

FIG. 10 is a diagram illustrating an example 1000 associated with HARQ-ACK codebook retransmission for multi-DCI based multi-TRP, in accordance with the present disclosure. As shown in FIG. 10, example 1000 includes multi-DCI based multi-TRP communications between a UE, a first TRP, and a second TRP. The first TRP may be associated with a first CORESET pool index (CORESET pool index 0), and the second TRP may be associated with a second CORESET pool index (CORESET pool index 1). The UE may be configured with separate HARQ feedback for multi-DCI based multi-TRP.

As shown in FIG. 10, and by reference number 1005, the UE may receive, in a CORESET associated with a CORESET pool index 0, DCI that includes a HARQ-ACK retransmission indication. For example, the first TRP may transmit the DCI to the UE. The UE may receive the DCI in slot n, and the DCI may indicate that a HARQ-ACK codebook in slot m is to be retransmitted in slot n+k. The DCI may include an indication of the offset l (e.g., l=5) between slot m and slot n (e.g., m=n−l) and an indication of the offset k between slot n and slot n+k.

As shown by reference number 1010, a first HARQ-ACK codebook associated with CORESET pool index value 0 and a second HARQ-ACK codebook associated with CORESET pool index value 1 may be scheduled in slot m. In some aspects, as shown in example 1000 of FIG. 10, the UE may determine which of the first HARQ-ACK codebook or the second HARQ-ACK codebook is the HARQ-ACK codebook to be re-transmitted based at least in part on the CORESET pool index associated with the CORESET in which the DCI is received/detected. For example, the HARQ-ACK codebook to be retransmitted may be the HARQ-ACK codebook associated with the same CORESET pool index and the CORESET in which the DCI is received by the UE. As shown in FIG. 10, the UE may determine that the HARQ-ACK codebook to be retransmitted in slot n+k is the first HARQ-ACK codebook based at least in part on the first HARQ-ACK codebook being associated with the same CORESET pool index (e.g., CORESET pool index value 0) as the CORESET in which the DCI is received. As shown by reference number 1015, in slot n+k, the UE may transmit (e.g., to the first TRP) a PUCCH communication including a retransmission of the first HARQ-ACK codebook scheduled in slot m.

As indicated above, FIG. 10 is provided as an example. Other examples may differ from what is described with respect to FIG. 10.

Figure 11:
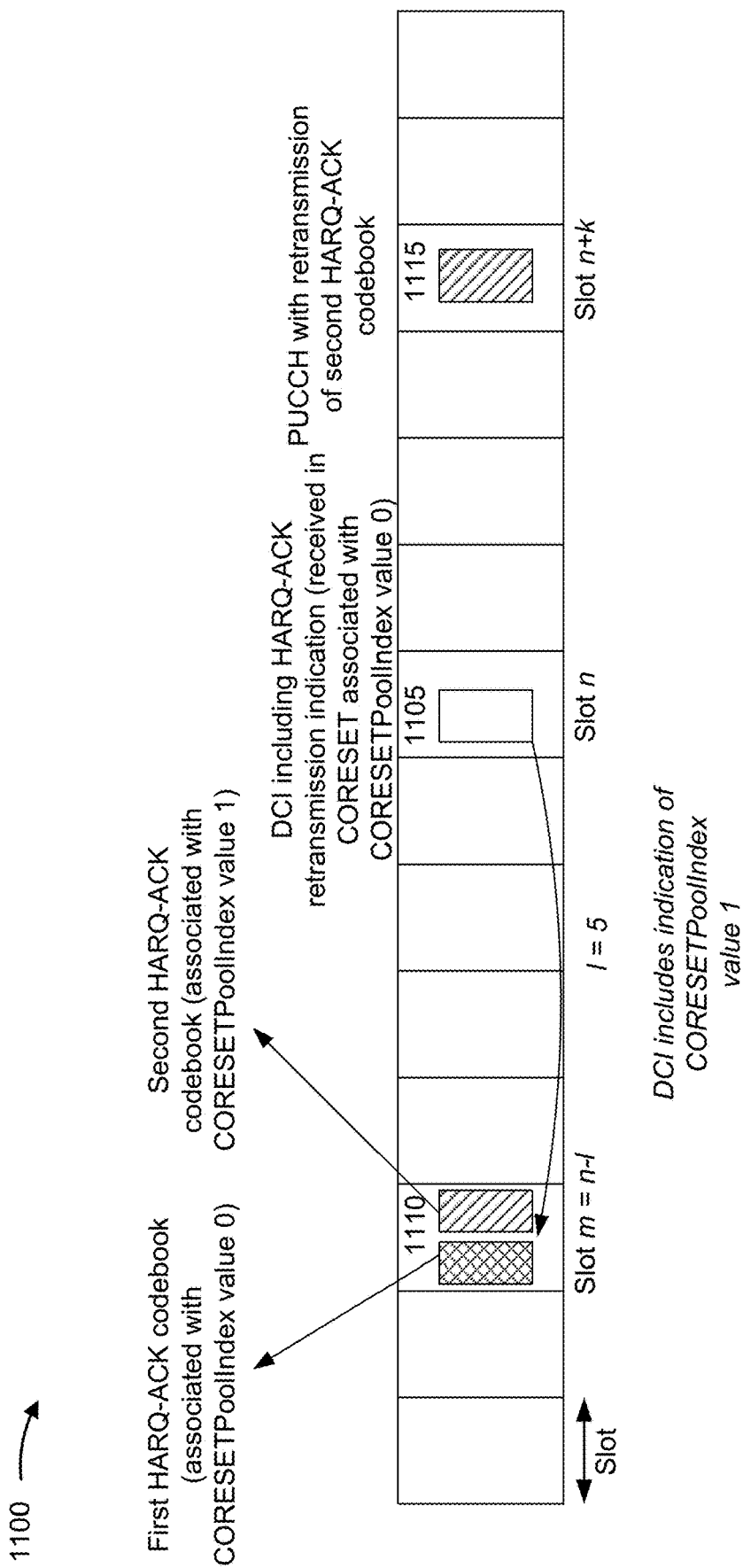

FIG. 11 is a diagram illustrating an example 1100 associated with HARQ-ACK codebook retransmission for multi-DCI based multi-TRP, in accordance with the present disclosure. As shown in FIG. 11, example 1100 includes multi-DCI based multi-TRP communications between a UE, a first TRP, and a second TRP. The first TRP may be associated with a first CORESET pool index (CORESET pool index 0), and the second TRP may be associated with a second CORESET pool index (CORESET pool index 1). The UE may be configured with separate HARQ feedback for multi-DCI based multi-TRP.

As shown in FIG. 11, and by reference number 1105, the UE may receive, in a CORESET associated with a CORESET pool index 0, DCI that includes a HARQ-ACK retransmission indication. For example, the first TRP may transmit the DCI to the UE. The UE may receive the DCI in slot n, and the DCI may indicate that a HARQ-ACK codebook in slot m is to be retransmitted in slot n+k. The DCI may include an indication of the offset l (e.g., l=5) between slot m and slot n (e.g., m=n−l) and an indication of the offset k between slot n and slot n+k. In some aspects, the DCI may include an indication of the CORESET pool index value for the HARQ-ACK codebook to be transmitted. For example, as shown in FIG. 11, the DCI may include an indication of CORESET pool index value 1 for the HARQ-ACK codebook to be retransmitted (e.g., an indication that the HARQ-ACK codebook to be retransmitted is associated with CORESET pool index value 1).

As shown by reference number 1110, a first HARQ-ACK codebook associated with CORESET pool index value 0 and a second HARQ-ACK codebook associated with CORESET pool index value 1 may be scheduled in slot m. In some aspects, as shown in example 1100 of FIG. 11, the UE may determine which of the first HARQ-ACK codebook or the second HARQ-ACK codebook is the HARQ-ACK codebook to be re-transmitted based at least in part on the indication, in the DCI, of the CORESET pool index value for the HARQ-ACK codebook to be retransmitted. For example, the HARQ-ACK codebook to be retransmitted may be the HARQ-ACK codebook associated with the same CORESET pool index and the CORESET in which the DCI is received by the UE. As shown in FIG. 11, the UE may determine that the HARQ-ACK codebook to be retransmitted in slot n+k is the second HARQ-ACK codebook based at least in part on the DCI indicating that the HARQ-ACK codebook to be retransmitted is associated with CORESET pool index value 1. As shown by reference number 1115, in slot n+k, the UE may transmit (e.g., to the second TRP) a PUCCH communication including a retransmission of the second HARQ-ACK codebook scheduled in slot m.

As indicated above, FIG. 11 is provided as an example. Other examples may differ from what is described with respect to FIG. 11.

Figure 12:
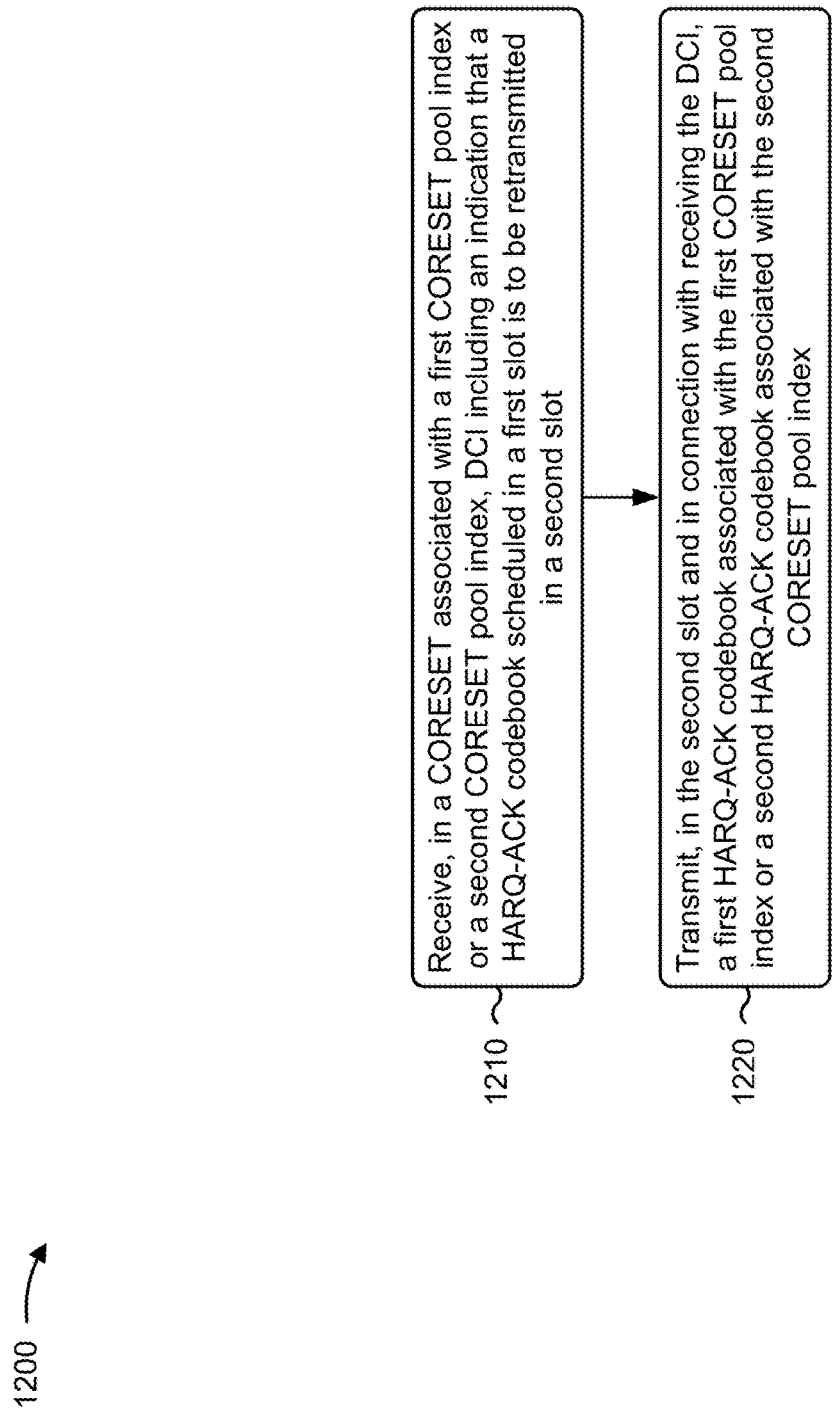
FIGS. 12-13 are diagrams illustrating example processes associated with HARQ-ACK codebook retransmission for multi-DCI based multi-TRP, in accordance with the present disclosure.

FIG. 12 is a diagram illustrating an example process 1200 performed, for example, by a UE, in accordance with the present disclosure. Example process 1200 is an example where the UE (e.g., UE 120) performs operations associated with HARQ-ACK codebook retransmission for multi-DCI based multi-TRP.

As shown in FIG. 12, in some aspects, process 1200 may include receiving, in a CORESET associated with a first CORESET pool index or a second CORESET pool index, DCI including an indication that a HARQ-ACK codebook scheduled in a first slot is to be retransmitted in a second slot (block 1210). For example, the UE (e.g., using communication manager 140 and/or reception component 1402, depicted in FIG. 14) may receive, in a CORESET associated with a first CORESET pool index or a second CORESET pool index, DCI including an indication that a HARQ-ACK codebook scheduled in a first slot is to be retransmitted in a second slot, as described above.

As further shown in FIG. 12, in some aspects, process 1200 may include transmitting, in the second slot and in connection with receiving the DCI, a first HARQ-ACK codebook associated with the first CORESET pool index or a second HARQ-ACK codebook associated with the second CORESET pool index (block 1220). For example, the UE (e.g., using communication manager 140 and/or transmission component 1404, depicted in FIG. 14) may transmit, in the second slot and in connection with receiving the DCI, a first HARQ-ACK codebook associated with the first CORESET pool index or a second HARQ-ACK codebook associated with the second CORESET pool index, as described above.

Process 1200 may include additional aspects, such as any single aspect or any combination of aspects described below and/or in connection with one or more other processes described elsewhere herein.

In a first aspect, the UE is configured with separate HARQ feedback reporting for the first CORESET pool index and the second CORESET pool index.

In a second aspect, alone or in combination with the first aspect, the DCI is DCI format 1_1 or DCI format 1_2 that includes a HARQ-ACK retransmission indicator field with a value of 1.

In a third aspect, alone or in combination with one or more of the first and second aspects, the DCI includes an indication of a first offset between the first slot and a third slot in which the DCI is received, and an indication of a second offset between the third slot in which the DCI is received and the second slot.

In a fourth aspect, alone or in combination with one or more of the first through third aspects, transmitting, in the second slot, the first HARQ-ACK codebook associated with the first CORESET pool index or the second HARQ-ACK codebook associated with the second CORESET pool index includes transmitting, in the second slot, one of the first HARQ-ACK codebook or the second HARQ-ACK codebook that is associated with a same CORESET pool index as the CORESET in which the DCI is received.

In a fifth aspect, alone or in combination with one or more of the first through fourth aspects, transmitting, in the second slot, the first HARQ-ACK codebook associated with the first CORESET pool index or the second HARQ-ACK codebook associated with the second CORESET pool index includes transmitting, in the second slot and in connection with a single HARQ-ACK codebook being scheduled in the first slot, the single HARQ-ACK codebook that is scheduled in the first slot, and the single HARQ-ACK codebook that is scheduled in the first slot is one of the first HARQ-ACK codebook associated with the first CORESET pool index or the second HARQ-ACK codebook associated with the second CORESET pool index.

In a sixth aspect, alone or in combination with one or more of the first through fifth aspects, the CORESET in which the DCI is received is associated with the first CORESET pool index, and the single HARQ-ACK codebook that is scheduled in the first slot is the second HARQ-ACK codebook associated with the second CORESET pool index.

In a seventh aspect, alone or in combination with one or more of the first through sixth aspects, transmitting, in the second slot, the first HARQ-ACK codebook associated with the first CORESET pool index or the second HARQ-ACK codebook associated with the second CORESET pool index includes transmitting, in the second slot and in connection with a single one of the first HARQ-ACK codebook or the second HARQ-ACK codebook being scheduled in the first slot, the single one of the first HARQ-ACK codebook or the second HARQ-ACK codebook that is scheduled in the first slot, or transmitting, in the second slot and in connection with the first HARQ-ACK codebook and the second HARQ-ACK codebook being scheduled in the first slot, one of the first HARQ-ACK codebook or the second HARQ-ACK codebook that is associated with a same CORESET pool index as the CORESET in which the DCI is received.

In an eighth aspect, alone or in combination with one or more of the first through seventh aspects, the DCI includes an indication of whether the HARQ-ACK codebook to be retransmitted is associated with the first CORESET pool index or the second CORESET pool index, and transmitting, in the second slot, the first HARQ-ACK codebook associated with the first CORESET pool index or the second HARQ-ACK codebook associated with the second CORESET pool index includes transmitting, in the second slot, one of the first HARQ-ACK codebook or the second HARQ-ACK codebook based at least in part on the indication of whether the HARQ-ACK codebook to be retransmitted is associated with the first CORESET pool index or the second CORESET pool index.

In a ninth aspect, alone or in combination with one or more of the first through eighth aspects, the indication of whether the HARQ-ACK codebook to be retransmitted is associated with the first CORESET pool index or the second CORESET pool index is included in a new data indicator field, a hybrid automatic repeat request process number field, a frequency domain resource allocation field, a time domain resource allocation field, or a redundancy version field of the DCI.

In a tenth aspect, alone or in combination with one or more of the first through ninth aspects, transmitting, in the second slot, the first HARQ-ACK codebook associated with the first CORESET pool index or the second HARQ-ACK codebook associated with the second CORESET pool index includes transmitting, in the second slot, the first HARQ-ACK codebook to a first TRP associated with the first CORESET pool index or the second HARQ-ACK codebook to a second TRP associated with the second CORESET pool index.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
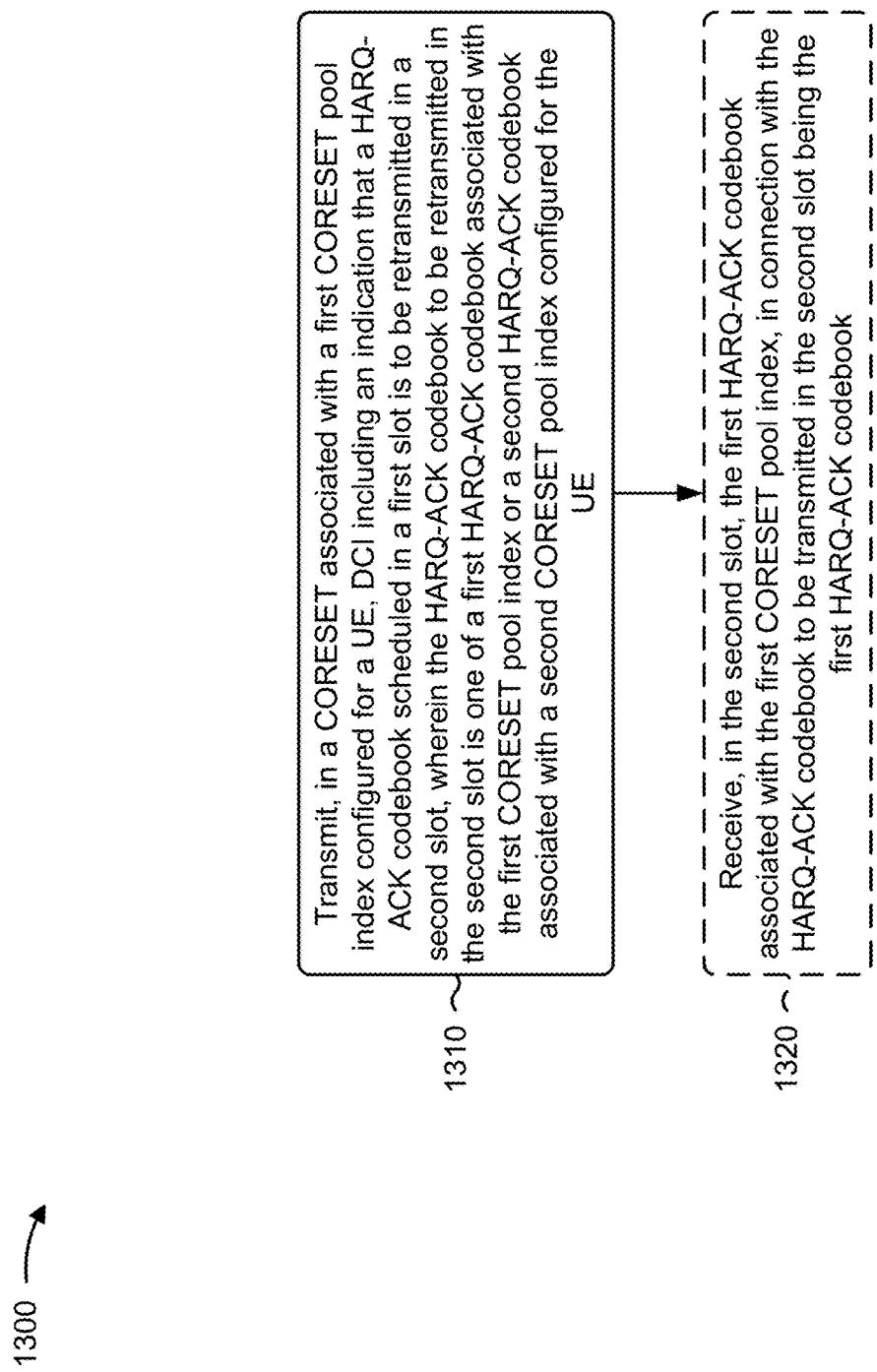

FIG. 13 is a diagram illustrating an example process 1300 performed, for example, by a network entity, in accordance with the present disclosure. Example process 1300 is an example where the network entity (e.g., TRP 905, base station 110, CU 310, DU 330, RU 340, or a combination thereof) performs operations associated with HARQ-ACK codebook retransmission for multi-DCI based multi-TRP.

As shown in FIG. 13, in some aspects, process 1300 may include transmitting, in a CORESET associated with a first CORESET pool index configured for a UE, DCI including an indication that a HARQ-ACK codebook scheduled in a first slot is to be retransmitted in a second slot, wherein the HARQ-ACK codebook to be retransmitted in the second slot is one of a first HARQ-ACK codebook associated with the first CORESET pool index or a second HARQ-ACK codebook associated with a second CORESET pool index configured for the UE (block 1310). For example, the network entity (e.g., using communication manager 1508 and/or transmission component 1504, depicted in FIG. 15) may transmit, in a CORESET associated with a first CORESET pool index configured for a UE, DCI including an indication that a HARQ-ACK codebook scheduled in a first slot is to be retransmitted in a second slot, wherein the HARQ-ACK codebook to be retransmitted in the second slot is one of a first HARQ-ACK codebook associated with the first CORESET pool index or a second HARQ-ACK codebook associated with a second CORESET pool index configured for the UE, as described above.

As shown in FIG. 13, in some aspects, process 1300 may include receiving, in the second slot, the first HARQ-ACK codebook associated with the first CORESET pool index, in connection with the HARQ-ACK codebook to be retransmitted in the second slot being the first HARQ-ACK codebook (block 1320). For example, the network entity (e.g., using communication manager 1508 and/or reception component 1502, depicted in FIG. 15) may receive, in the second slot, the first HARQ-ACK codebook associated with the first CORESET pool index, in connection with the HARQ-ACK codebook to be retransmitted in the second slot being the first HARQ-ACK codebook, as described above.

Process 1300 may include additional aspects, such as any single aspect or any combination of aspects described below and/or in connection with one or more other processes described elsewhere herein.

In a first aspect, the UE is configured with separate hybrid automatic repeat request (HARQ) feedback reporting for the first CORESET pool index and the second CORESET pool index.

In a second aspect, the DCI is DCI format 1_1 or DCI format 1_2 that includes a HARQ-ACK retransmission indicator field with a value of 1.

In a third aspect, the DCI includes an indication of a first offset between the first slot and a third slot in which the DCI is received, and an indication of a second offset between the third slot in which the DCI is received and the second slot.

In a fourth aspect, the HARQ-ACK codebook to be re-transmitted is the first HARQ-ACK codebook based at least in part on the first HARQ-ACK codebook being associated with a same CORESET pool index as the CORESET in which the DCI is transmitted.

In a fifth aspect, the HARQ-ACK codebook to be re-transmitted, in connection with a single one of the first HARQ-ACK codebook or the second HARQ-ACK codebook being scheduled in the first slot, is the single one of the first HARQ-ACK codebook or the second HARQ-ACK codebook that is scheduled in the first slot, or the HARQ-ACK codebook to be re-transmitted, in connection with the first HARQ-ACK codebook and the second HARQ-ACK codebook being scheduled in the first slot, is the first HARQ-ACK codebook based at least in part on the first HARQ-ACK codebook being associated with a same CORESET pool index as the CORESET in which the DCI is transmitted.

In a sixth aspect, the HARQ-ACK codebook to be re-transmitted is the second HARQ-ACK codebook associated with the second CORESET pool index in connection with the second HARQ-ACK codebook being the single one of the first HARQ-ACK codebook or the second HARQ-ACK codebook that is scheduled in the first slot.

In a seventh aspect, the DCI includes an indication of whether the HARQ-ACK codebook to be retransmitted is associated with the first CORESET pool index or the second CORESET pool index.

In an eighth aspect, process 1300 includes receiving, in the second slot, the first HARQ-ACK codebook associated with the first CORESET pool index, in connection with the DCI indicating that the HARQ-ACK codebook to be retransmitted is associated with the first CORESET pool index.

In a ninth aspect, the indication of whether the HARQ-ACK codebook to be retransmitted is associated with the first CORESET pool index or the second CORESET pool index is included in a new data indicator field, a hybrid automatic repeat request process number field, a frequency domain resource allocation field, a time domain resource allocation field, or a redundancy version field of the DCI.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
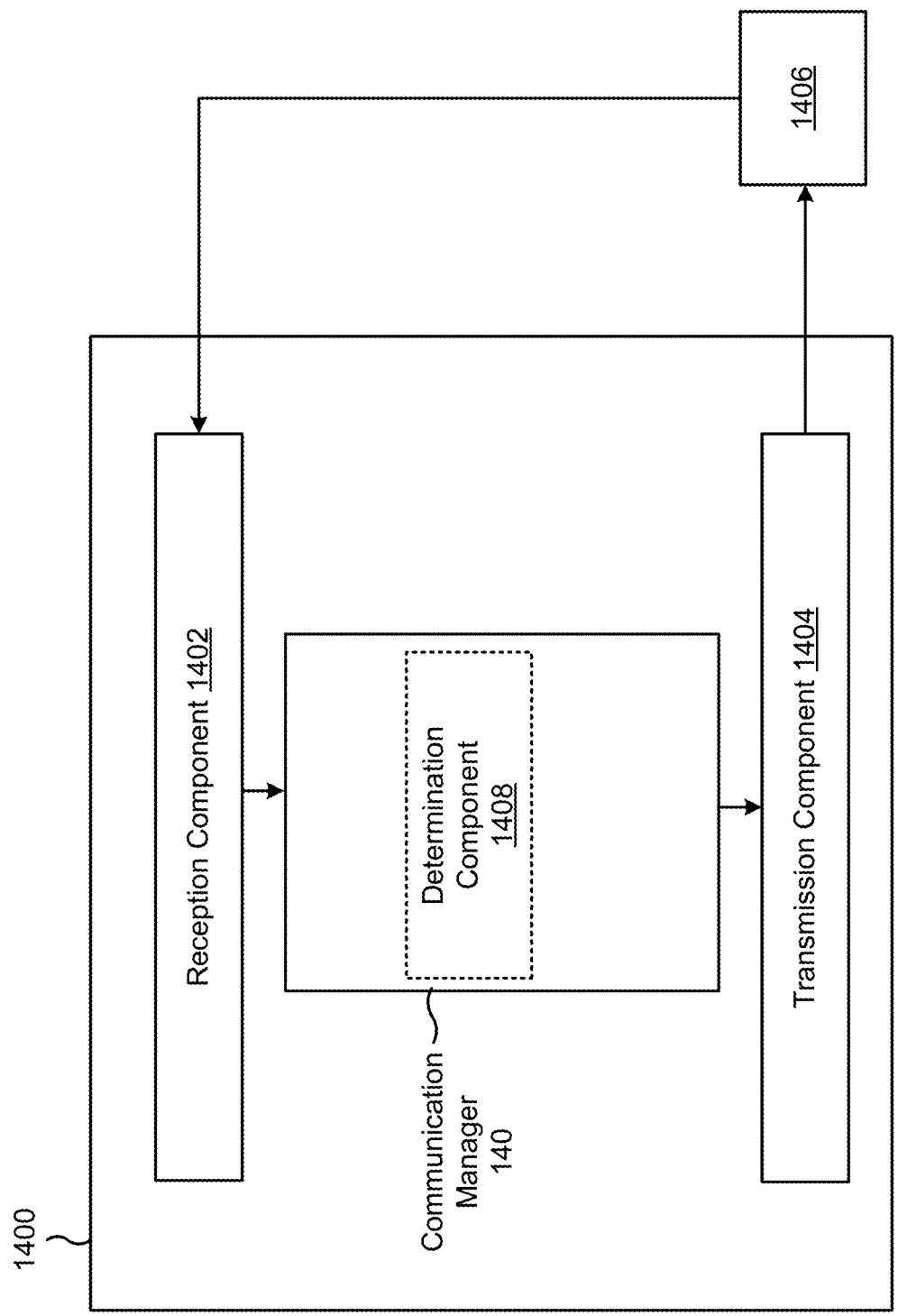
FIGS. 14-15 are diagrams of example apparatuses for wireless communication, in accordance with the present disclosure.

FIG. 14 is a diagram of an example apparatus 1400 for wireless communication. The apparatus 1400 may be a UE, or a UE may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include the communication manager 140. The communication manager 140 may include a determination component 1408, among other examples.

In some aspects, the apparatus 1400 may be configured to perform one or more operations described herein in connection with FIGS. 9-11. Additionally, or alternatively, the apparatus 1400 may be configured to perform one or more processes described herein, such as process 1200 of FIG. 12, or a combination thereof. In some aspects, the apparatus 1400 and/or one or more components shown in FIG. 14 may include one or more components of the UE described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the UE described in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the UE described in connection with FIG. 2. In some aspects, the transmission component 1404 may be co-located with the reception component 1402 in a transceiver.

The reception component 1402 may receive, in a CORESET associated with a first CORESET pool index or a second CORESET pool index, DCI including an indication that a HARQ-ACK codebook scheduled in a first slot is to be retransmitted in a second slot. The transmission component 1404 may transmit, in the second slot and in connection with receiving the DCI, a first HARQ-ACK codebook associated with the first CORESET pool index or a second HARQ-ACK codebook associated with the second CORESET pool index.

The determination component 1408 may determine whether the HARQ-ACK codebook to be retransmitted is the first HARQ-ACK codebook associated with the first CORESET pool index or the second HARQ-ACK codebook associated with the second CORESET pool index.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

Figure 15:
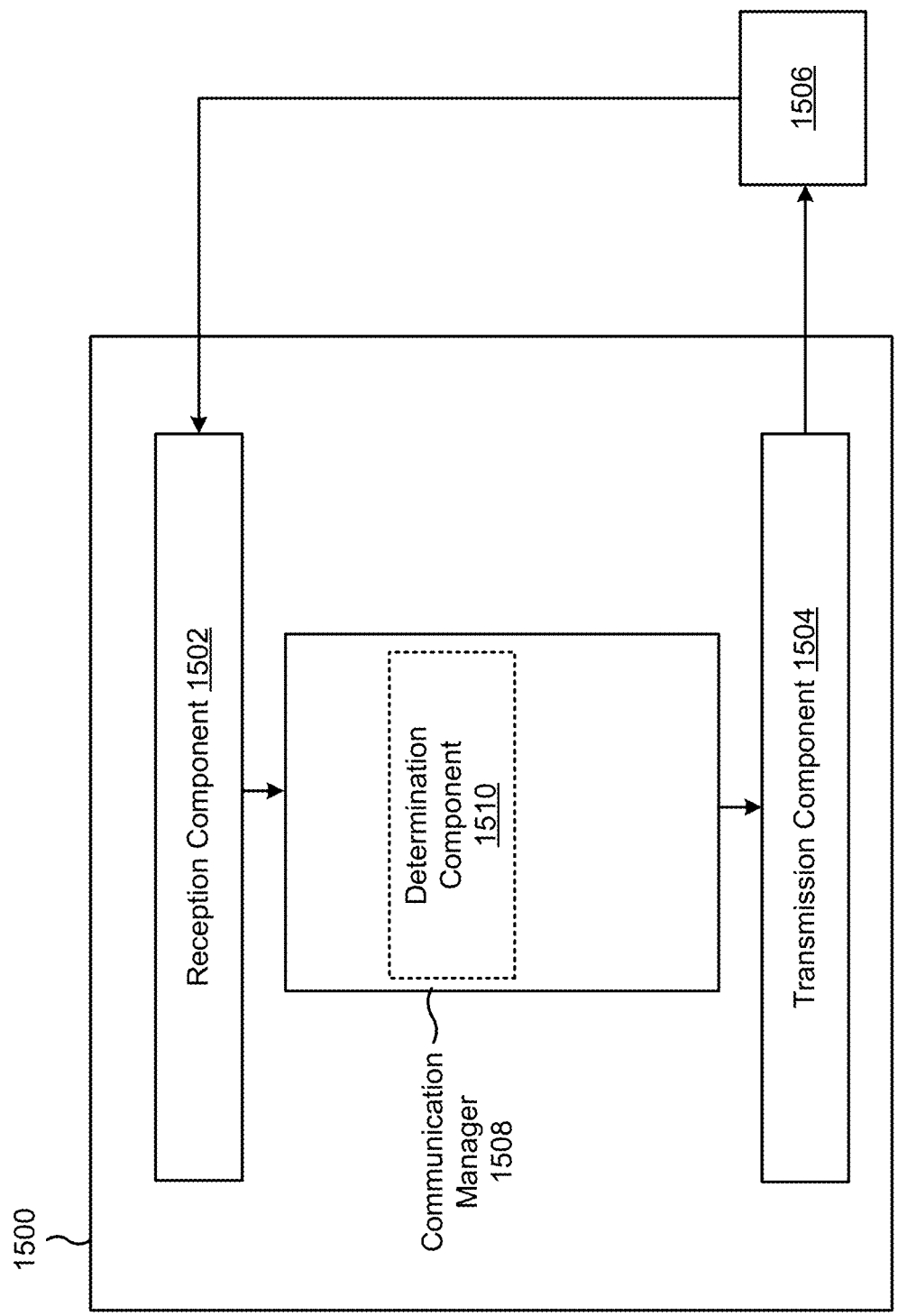

FIG. 15 is a diagram of an example apparatus 1500 for wireless communication. The apparatus 1500 may be a network entity, or a network entity may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include the communication manager 1508. The communication manager 1508) may include a determination component 1510, among other examples.

In some aspects, the apparatus 1500 may be configured to perform one or more operations described herein in connection with FIGS. 9-11. Additionally, or alternatively, the apparatus 1500 may be configured to perform one or more processes described herein, such as process 1300 of FIG. 13, or a combination thereof. In some aspects, the apparatus 1500 and/or one or more components shown in FIG. 15 may include one or more components of the network entity described in connection with FIG. 2. Additionally, or alternatively, one or more components shown in FIG. 15 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The communication manager 1508 may control and/or otherwise manage one or more operations of the reception component 1502 and/or the transmission component 1504. In some aspects, the communication manager 1508 may include one or more antennas, a modem, a controller/processor, a memory, or a combination thereof, of the base station described in connection with FIG. 2. The communication manager 1508 may be, or be similar to, the communication manager 150 depicted in FIGS. 1 and 2. For example, in some aspects, the communication manager 1508 may be configured to perform one or more of the functions described as being performed by the communication manager 150. In some aspects, the communication manager 1508 may include the reception component 1502 and/or the transmission component 1504.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1500. In some aspects, the reception component 1502 may include one or more antennas, a modem, a demodulator, a MIMO detector, a receive processor, a controller/processor, a memory, or a combination thereof, of the network entity described in connection with FIG. 2.

The transmission component 1504 may transmit communications, such as reference signals, control information, data communications, or a combination thereof, to the apparatus 1506. In some aspects, one or more other components of the apparatus 1500 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modem, a modulator, a transmit MIMO processor, a transmit processor, a controller/processor, a memory, or a combination thereof, of the network entity described in connection with FIG. 2. In some aspects, the transmission component 1504 may be co-located with the reception component 1502 in a transceiver.

The transmission component 1504 may transmit, in a CORESET associated with a first CORESET pool index configured for a UE, DCI including an indication that a HARQ-ACK codebook scheduled in a first slot is to be retransmitted in a second slot, wherein the HARQ-ACK codebook to be retransmitted in the second slot is one of a first HARQ-ACK codebook associated with the first CORESET pool index or a second HARQ-ACK codebook associated with a second CORESET pool index configured for the UE.

The reception component 1502 may receive, in the second slot, the first HARQ-ACK codebook associated with the first CORESET pool index, in connection with the HARQ-ACK codebook to be retransmitted in the second slot being the first HARQ-ACK codebook.

The reception component 1502 may receive, in the second slot, the first HARQ-ACK codebook associated with the first CORESET pool index, in connection with the DCI indicating that the HARQ-ACK codebook to be retransmitted is associated with the first CORESET pool index.

The determination component 1510 may determine whether the HARQ-ACK codebook to be retransmitted is the first HARQ-ACK codebook associated with the first CORESET pool index or the second HARQ-ACK codebook associated with the second CORESET pool index.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

The following provides an overview of some Aspects of the present disclosure:

Aspect 1: A method of wireless communication performed by a user equipment (UE), comprising: receiving, in a control resource set (CORESET) associated with a first CORESET pool index or a second CORESET pool index, downlink control information (DCI) including an indication that a hybrid automatic repeat request acknowledgement (HARQ-ACK) codebook scheduled in a first slot is to be retransmitted in a second slot; and transmitting, in the second slot and in connection with receiving the DCI, a first HARQ-ACK codebook associated with the first CORESET pool index or a second HARQ-ACK codebook associated with the second CORESET pool index.

Aspect 2: The method of Aspect 1, wherein the UE is configured with separate hybrid automatic repeat request (HARQ) feedback reporting for the first CORESET pool index and the second CORESET pool index.

Aspect 3: The method of any of Aspects 1-2, wherein the DCI is DCI format 1_1 or DCI format 1_2 that includes a HARQ-ACK retransmission indicator field with a value of 1.

Aspect 4: The method of any of Aspects 1-3, wherein the DCI includes an indication of a first offset between the first slot and a third slot in which the DCI is received, and an indication of a second offset between the third slot in which the DCI is received and the second slot.

Aspect 5: The method of any of Aspects 1-4, wherein transmitting, in the second slot, the first HARQ-ACK codebook associated with the first CORESET pool index or the second HARQ-ACK codebook associated with the second CORESET pool index comprises: transmitting, in the second slot, one of the first HARQ-ACK codebook or the second HARQ-ACK codebook that is associated with a same CORESET pool index as the CORESET in which the DCI is received.

Aspect 6: The method of any of Aspects 1-4, wherein transmitting, in the second slot, the first HARQ-ACK codebook associated with the first CORESET pool index or the second HARQ-ACK codebook associated with the second CORESET pool index comprises: transmitting, in the second slot and in connection with a single HARQ-ACK codebook being scheduled in the first slot, the single HARQ-ACK codebook that is scheduled in the first slot, wherein the single HARQ-ACK codebook that is scheduled in the first slot is one of the first HARQ-ACK codebook associated with the first CORESET pool index or the second HARQ-ACK codebook associated with the second CORESET pool index.

Aspect 7: The method of Aspect 6, wherein the CORESET in which the DCI is received is associated with the first CORESET pool index, and wherein the single HARQ-ACK codebook that is scheduled in the first slot is the second HARQ-ACK codebook associated with the second CORESET pool index.

Aspect 8: The method of any of Aspects 1-7, wherein transmitting, in the second slot, the first HARQ-ACK codebook associated with the first CORESET pool index or the second HARQ-ACK codebook associated with the second CORESET pool index comprises: transmitting, in the second slot and in connection with a single one of the first HARQ-ACK codebook or the second HARQ-ACK codebook being scheduled in the first slot, the single one of the first HARQ-ACK codebook or the second HARQ-ACK codebook that is scheduled in the first slot; or transmitting, in the second slot and in connection with the first HARQ-ACK codebook and the second HARQ-ACK codebook being scheduled in the first slot, one of the first HARQ-ACK codebook or the second HARQ-ACK codebook that is associated with a same CORESET pool index as the CORESET in which the DCI is received.

Aspect 9: The method of any of Aspects 1-4, wherein the DCI includes an indication of whether the HARQ-ACK codebook to be retransmitted is associated with the first CORESET pool index or the second CORESET pool index, and wherein transmitting, in the second slot, the first HARQ-ACK codebook associated with the first CORESET pool index or the second HARQ-ACK codebook associated with the second CORESET pool index comprises: transmitting, in the second slot, one of the first HARQ-ACK codebook or the second HARQ-ACK codebook based at least in part on the indication of whether the HARQ-ACK codebook to be retransmitted is associated with the first CORESET pool index or the second CORESET pool index.

Aspect 10: The method of Aspect 9, wherein the indication of whether the HARQ-ACK codebook to be retransmitted is associated with the first CORESET pool index or the second CORESET pool index is included in a new data indicator field, a hybrid automatic repeat request process number field, a frequency domain resource allocation field, a time domain resource allocation field, or a redundancy version field of the DCI.

Aspect 11: The method of any of Aspects 1-10, wherein transmitting, in the second slot, the first HARQ-ACK codebook associated with the first CORESET pool index or the second HARQ-ACK codebook associated with the second CORESET pool index comprises: transmitting, in the second slot, the first HARQ-ACK codebook to a first transmit receive point (TRP) associated with the first CORESET pool index or the second HARQ-ACK codebook to a second TRP associated with the second CORESET pool index.

Aspect 12: A method of wireless communication performed by a network entity, comprising: transmitting, in a control resource set (CORESET) associated with a first CORESET pool index configured for a user equipment (UE), downlink control information (DCI) including an indication that a hybrid automatic repeat request acknowledgement (HARQ-ACK) codebook scheduled in a first slot is to be retransmitted in a second slot, wherein the HARQ-ACK codebook to be retransmitted in the second slot is one of a first HARQ-ACK codebook associated with the first CORESET pool index or a second HARQ-ACK codebook associated with a second CORESET pool index configured for the UE.

Aspect 13: The method of Aspect 12, wherein the UE is configured with separate hybrid automatic repeat request (HARQ) feedback reporting for the first CORESET pool index and the second CORESET pool index.

Aspect 14: The method of any of Aspects 12-13, wherein the DCI is DCI format 1_1 or DCI format 1_2 that includes a HARQ-ACK retransmission indicator field with a value of 1.

Aspect 15: The method of any of Aspects 12-14, wherein the DCI includes an indication of a first offset between the first slot and a third slot in which the DCI is received, and an indication of a second offset between the third slot in which the DCI is received and the second slot.

Aspect 16: The method of any of Aspects 12-15, further comprising: receiving, in the second slot, the first HARQ-ACK codebook associated with the first CORESET pool index, in connection with the HARQ-ACK codebook to be retransmitted in the second slot being the first HARQ-ACK codebook.

Aspect 17: The method of Aspect 16, wherein the HARQ-ACK codebook to be re-transmitted is the first HARQ-ACK codebook based at least in part on the first HARQ-ACK codebook being associated with a same CORESET pool index as the CORESET in which the DCI is transmitted.

Aspect 18: The method of any of Aspects 12-17, wherein: the HARQ-ACK codebook to be re-transmitted, in connection with a single one of the first HARQ-ACK codebook or the second HARQ-ACK codebook being scheduled in the first slot, is the single one of the first HARQ-ACK codebook or the second HARQ-ACK codebook that is scheduled in the first slot, or the HARQ-ACK codebook to be re-transmitted, in connection with the first HARQ-ACK codebook and the second HARQ-ACK codebook being scheduled in the first slot, is the first HARQ-ACK codebook based at least in part on the first HARQ-ACK codebook being associated with a same CORESET pool index as the CORESET in which the DCI is transmitted.

Aspect 19: The method of Aspect 18, wherein the HARQ-ACK codebook to be re-transmitted is the second HARQ-ACK codebook associated with the second CORESET pool index in connection with the second HARQ-ACK codebook being the single one of the first HARQ-ACK codebook or the second HARQ-ACK codebook that is scheduled in the first slot.

Aspect 20: The method of any of Aspects 12-16, wherein the DCI includes an indication of whether the HARQ-ACK codebook to be retransmitted is associated with the first CORESET pool index or the second CORESET pool index.

Aspect 21: The method of Aspect 20, further comprising: receiving, in the second slot, the first HARQ-ACK codebook associated with the first CORESET pool index, in connection with the DCI indicating that the HARQ-ACK codebook to be retransmitted is associated with the first CORESET pool index.

Aspect 22: The method of any of Aspects 20-21, wherein the indication of whether the HARQ-ACK codebook to be retransmitted is associated with the first CORESET pool index or the second CORESET pool index is included in a new data indicator field, a hybrid automatic repeat request process number field, a frequency domain resource allocation field, a time domain resource allocation field, or a redundancy version field of the DCI.

Aspect 23: An apparatus for wireless communication at a device, comprising a processor; memory coupled with the processor; and instructions stored in the memory and executable by the processor to cause the apparatus to perform the method of one or more of Aspects 1-11.

Aspect 24: A device for wireless communication, comprising a memory and one or more processors coupled to the memory, the one or more processors configured to perform the method of one or more of Aspects 1-11.

Aspect 25: An apparatus for wireless communication, comprising at least one means for performing the method of one or more of Aspects 1-11.

Aspect 26: A non-transitory computer-readable medium storing code for wireless communication, the code comprising instructions executable by a processor to perform the method of one or more of Aspects 1-11.

Aspect 27: A non-transitory computer-readable medium storing a set of instructions for wireless communication, the set of instructions comprising one or more instructions that, when executed by one or more processors of a device, cause the device to perform the method of one or more of Aspects 1-11.

Aspect 28: An apparatus for wireless communication at a device, comprising a processor; memory coupled with the processor; and instructions stored in the memory and executable by the processor to cause the apparatus to perform the method of one or more of Aspects 12-22.

Aspect 29: A device for wireless communication, comprising a memory and one or more processors coupled to the memory, the one or more processors configured to perform the method of one or more of Aspects 12-22.

Aspect 30: An apparatus for wireless communication, comprising at least one means for performing the method of one or more of Aspects 12-22.

Aspect 31: A non-transitory computer-readable medium storing code for wireless communication, the code comprising instructions executable by a processor to perform the method of one or more of Aspects 12-22.

Aspect 32: A non-transitory computer-readable medium storing a set of instructions for wireless communication, the set of instructions comprising one or more instructions that, when executed by one or more processors of a device, cause the device to perform the method of one or more of Aspects 12-22.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving, in a control resource set (CORESET) associated with a first CORESET pool index or a second CORESET pool index, downlink control information (DCI) including:
      an indication that a hybrid automatic repeat request acknowledgement (HARQ-ACK) codebook scheduled in a first slot is to be retransmitted in a second slot,
      an indication of a first offset between the first slot and a third slot in which the DCI is received, and
      an indication of a second offset between the third slot in which the DCI is received and the second slot; and
   transmitting, in the second slot and in connection with receiving the DCI, a first HARQ-ACK codebook associated with the first CORESET pool index or a second HARQ-ACK codebook associated with the second CORESET pool index.

2. The method of claim 1,
   wherein the UE is configured with separate hybrid automatic repeat request (HARQ) feedback reporting for the first CORESET pool index and the second CORESET pool index.

3. The method of claim 1,
   wherein the DCI is DCI format 1_1 or DCI format 1_2 that includes a HARQ-ACK retransmission indicator field with a value of 1.

4. The method of claim 1,
   wherein transmitting, in the second slot, the first HARQ-ACK codebook associated with the first CORESET pool index or the second HARQ-ACK codebook associated with the second CORESET pool index comprises:
      transmitting, in the second slot, one of the first HARQ-ACK codebook or the second HARQ-ACK codebook that is associated with a same CORESET pool index as the CORESET in which the DCI is received.

5. The method of claim 1,
   wherein transmitting, in the second slot, the first HARQ-ACK codebook associated with the first CORESET pool index or the second HARQ-ACK codebook associated with the second CORESET pool index comprises:
      transmitting, in the second slot and in connection with a single HARQ-ACK codebook being scheduled in the first slot, the single HARQ-ACK codebook that is scheduled in the first slot, wherein the single HARQ-ACK codebook that is scheduled in the first slot is one of the first HARQ-ACK codebook associated with the first CORESET pool index or the second HARQ-ACK codebook associated with the second CORESET pool index.

6. The method of claim 5,
   wherein the CORESET in which the DCI is received is associated with the first CORESET pool index, and wherein the single HARQ-ACK codebook that is scheduled in the first slot is the second HARQ-ACK codebook associated with the second CORESET pool index.

7. The method of claim 1,
   wherein transmitting, in the second slot, the first HARQ-ACK codebook associated with the first CORESET pool index or the second HARQ-ACK codebook associated with the second CORESET pool index comprises:
      transmitting, in the second slot and in connection with a single one of the first HARQ-ACK codebook or the second HARQ-ACK codebook being scheduled in the first slot, the single one of the first HARQ-ACK codebook or the second HARQ-ACK codebook that is scheduled in the first slot; or
      transmitting, in the second slot and in connection with the first HARQ-ACK codebook and the second HARQ-ACK codebook being scheduled in the first slot, one of the first HARQ-ACK codebook or the second HARQ-ACK codebook that is associated with a same CORESET pool index as the CORESET in which the DCI is received.

8. The method of claim 1,
   wherein the DCI includes an indication of whether the HARQ-ACK codebook to be retransmitted is associated with the first CORESET pool index or the second CORESET pool index, and wherein transmitting, in the second slot, the first HARQ-ACK codebook associated with the first CORESET pool index or the second HARQ-ACK codebook associated with the second CORESET pool index comprises:
      transmitting, in the second slot, one of the first HARQ-ACK codebook or the second HARQ-ACK codebook based at least in part on the indication of whether the HARQ-ACK codebook to be retransmitted is associated with the first CORESET pool index or the second CORESET pool index.

9. The method of claim 8,
   wherein the indication of whether the HARQ-ACK codebook to be retransmitted is associated with the first CORESET pool index or the second CORESET pool index is included in a new data indicator field, a hybrid automatic repeat request process number field, a frequency domain resource allocation field, a time domain resource allocation field, or a redundancy version field of the DCI.

10. The method of claim 1,
   wherein transmitting, in the second slot, the first HARQ-ACK codebook associated with the first CORESET pool index or the second HARQ-ACK codebook associated with the second CORESET pool index comprises:
      transmitting, in the second slot, the first HARQ-ACK codebook to a first transmit receive point (TRP) associated with the first CORESET pool index or the second HARQ-ACK codebook to a second TRP associated with the second CORESET pool index.

11. The method of claim 1,
wherein the UE is configured with separate hybrid automatic repeat request (HARQ) feedback reporting for the first CORESET pool index and the second CORESET pool index, and wherein transmitting, in the second slot, the first HARQ-ACK codebook associated with the first CORESET pool index or the second HARQ-ACK codebook associated with the second CORESET pool index comprises:
transmitting, in the second slot, one of the first HARQ-ACK codebook or the second HARQ-ACK codebook that is associated with a same CORESET pool index as the CORESET in which the DCI is received.

12. The method of claim 1,
wherein the first offset is indicated in a modulation and coding scheme field in the DCI.

13. A method of wireless communication performed by a network entity, comprising:
transmitting, in a control resource set (CORESET) associated with a first CORESET pool index configured for a user equipment (UE), downlink control information (DCI) including:
an indication that a hybrid automatic repeat request acknowledgement (HARQ-ACK) codebook scheduled in a first slot is to be retransmitted in a second slot,
an indication of a first offset between the first slot and a third slot in which the DCI is received, and
an indication of a second offset between the third slot in which the DCI is received and the second slot,
wherein the HARQ-ACK codebook to be retransmitted in the second slot is one of a first HARQ-ACK codebook associated with the first CORESET pool index or a second HARQ-ACK codebook associated with a second CORESET pool index configured for the UE.

14. The method of claim 13,
wherein the UE is configured with separate hybrid automatic repeat request (HARQ) feedback reporting for the first CORESET pool index and the second CORESET pool index.

15. The method of claim 13, further comprising:
receiving, in the second slot, the first HARQ-ACK codebook associated with the first CORESET pool index, in connection with the HARQ-ACK codebook to be retransmitted in the second slot being the first HARQ-ACK codebook, wherein the HARQ-ACK codebook to be re-transmitted is the first HARQ-ACK codebook based at least in part on the first HARQ-ACK codebook being associated with a same CORESET pool index as the CORESET in which the DCI is transmitted.

16. The method of claim 13, wherein:
the HARQ-ACK codebook to be re-transmitted, in connection with a single one of the first HARQ-ACK codebook or the second HARQ-ACK codebook being scheduled in the first slot, is the single one of the first HARQ-ACK codebook or the second HARQ-ACK codebook that is scheduled in the first slot,
the HARQ-ACK codebook to be re-transmitted, in connection with the first HARQ-ACK codebook and the second HARQ-ACK codebook being scheduled in the first slot, is the first HARQ-ACK codebook based at least in part on the first HARQ-ACK codebook being associated with a same CORESET pool index as the CORESET in which the DCI is transmitted.

17. The method of claim 13,
wherein the DCI includes an indication of whether the HARQ-ACK codebook to be retransmitted is associated with the first CORESET pool index or the second CORESET pool index.

18. The method of claim 17, further comprising:
receiving, in the second slot, the first HARQ-ACK codebook associated with the first CORESET pool index, in connection with the DCI indicating that the HARQ-ACK codebook to be retransmitted is associated with the first CORESET pool index.

19. The method of claim 17,
wherein the indication of whether the HARQ-ACK codebook to be retransmitted is associated with the first CORESET pool index or the second CORESET pool index is included in a new data indicator field, a hybrid automatic repeat request process number field, a frequency domain resource allocation field, a time domain resource allocation field, or a redundancy version field of the DCI.

20. A user equipment (UE) for wireless communication, comprising:
one or more memories; and
one or more processors, coupled to the one or more memories, configured to:
receive, in a control resource set (CORESET) associated with a first CORESET pool index or a second CORESET pool index, downlink control information (DCI) including:
an indication that a hybrid automatic repeat request acknowledgement (HARQ-ACK) codebook scheduled in a first slot is to be retransmitted in a second slot,
an indication of a first offset between the first slot and a third slot in which the DCI is received, and
an indication of a second offset between the third slot in which the DCI is received and the second slot; and
transmit, in the second slot and in connection with receiving the DCI, a first HARQ-ACK codebook associated with the first CORESET pool index or a second HARQ-ACK codebook associated with the second CORESET pool index.

21. The UE of claim 20,
wherein the UE is configured with separate hybrid automatic repeat request (HARQ) feedback reporting for the first CORESET pool index and the second CORESET pool index.

22. The UE of claim 20,
wherein the one or more processors, to transmit, in the second slot, the first HARQ-ACK codebook associated with the first CORESET pool index or the second HARQ-ACK codebook associated with the second CORESET pool index, are configured to:
transmit, in the second slot, one of the first HARQ-ACK codebook or the second HARQ-ACK codebook that is associated with a same CORESET pool index as the CORESET in which the DCI is received.

23. The UE of claim 20,
wherein the one or more processors, to transmit, in the second slot, the first HARQ-ACK codebook associated with the first CORESET pool index or the second HARQ-ACK codebook associated with the second CORESET pool index, are configured to:
transmit, in the second slot and in connection with a single HARQ-ACK codebook being scheduled in the first slot, the single HARQ-ACK codebook that is scheduled in the first slot, wherein the single HARQ- ACK codebook that is scheduled in the first slot is one of the first HARQ-ACK codebook associated with the first CORESET pool index or the second HARQ-ACK codebook associated with the second CORESET pool index.

24. The UE of claim 20,
wherein the one or more processors, to transmit, in the second slot, the first HARQ-ACK codebook associated with the first CORESET pool index or the second HARQ-ACK codebook associated with the second CORESET pool index, are configured to:
  transmit, in the second slot and in connection with a single one of the first HARQ-ACK codebook or the second HARQ-ACK codebook being scheduled in the first slot, the single one of the first HARQ-ACK codebook or the second HARQ-ACK codebook that is scheduled in the first slot; or
  transmit, in the second slot and in connection with the first HARQ-ACK codebook and the second HARQ-ACK codebook being scheduled in the first slot, one of the first HARQ-ACK codebook or the second HARQ-ACK codebook that is associated with a same CORESET pool index as the CORESET in which the DCI is received.

25. The UE of claim 20,
wherein the DCI includes an indication of whether the HARQ-ACK codebook to be retransmitted is associated with the first CORESET pool index or the second CORESET pool index, and wherein the one or more processors, to transmit, in the second slot, the first HARQ-ACK codebook associated with the first CORESET pool index or the second HARQ-ACK codebook associated with the second CORESET pool index, are configured to:
  transmit, in the second slot, one of the first HARQ-ACK codebook or the second HARQ-ACK codebook based at least in part on the indication of whether the HARQ-ACK codebook to be retransmitted is associated with the first CORESET pool index or the second CORESET pool index.

26. The UE of claim 25,
wherein the indication of whether the HARQ-ACK codebook to be retransmitted is associated with the first CORESET pool index or the second CORESET pool index is included in a new data indicator field, a hybrid automatic repeat request process number field, a frequency domain resource allocation field, a time domain resource allocation field, or a redundancy version field of the DCI.

27. The UE of claim 20,
wherein the one or more processors, to transmit, in the second slot, the first HARQ-ACK codebook associated with the first CORESET pool index or the second HARQ-ACK codebook associated with the second CORESET pool index, are configured to:
  transmit, in the second slot, the first HARQ-ACK codebook to a first transmit receive point (TRP) associated with the first CORESET pool index or the second HARQ-ACK codebook to a second TRP associated with the second CORESET pool index.

28. The UE of claim 20,
wherein the UE is configured with separate hybrid automatic repeat request (HARQ) feedback reporting for the first CORESET pool index and the second CORESET pool index, and wherein the one or more processors, to transmit, in the second slot, the first HARQ-ACK codebook associated with the first CORESET pool index or the second HARQ-ACK codebook associated with the second CORESET pool index, are configured to:
  transmit, in the second slot, one of the first HARQ-ACK codebook or the second HARQ-ACK codebook that is associated with a same CORESET pool index as the CORESET in which the DCI is received.

29. A network entity for wireless communication, comprising:
  a memory; and
  one or more processors, coupled to the memory, configured to:
    transmit, in a control resource set (CORESET) associated with a first CORESET pool index configured for a user equipment (UE), downlink control information (DCI) including:
      an indication that a hybrid automatic repeat request acknowledgement (HARQ-ACK) codebook scheduled in a first slot is to be retransmitted in a second slot,
      an indication of a first offset between the first slot and a third slot in which the DCI is received, and
      an indication of a second offset between the third slot in which the DCI is received and the second slot,
    wherein the HARQ-ACK codebook to be retransmitted in the second slot is one of a first HARQ-ACK codebook associated with the first CORESET pool index or a second HARQ-ACK codebook associated with a second CORESET pool index configured for the UE.

30. The network entity of claim 29,
wherein the one or more processors are further configured to:
  receive, in the second slot, the first HARQ-ACK codebook associated with the first CORESET pool index, in connection with the HARQ-ACK codebook to be retransmitted in the second slot being the first HARQ-ACK codebook, wherein the HARQ-ACK codebook to be re-transmitted is the first HARQ-ACK codebook based at least in part on the first HARQ-ACK codebook being associated with a same CORESET pool index as the CORESET in which the DCI is transmitted.

* * * * *